United States Patent
Vincent et al.

(10) Patent No.: US 6,264,066 B1
(45) Date of Patent: Jul. 24, 2001

(54) APPARATUS AND METHOD FOR DISPENSING A DESIRED PORTION OF FROZEN PRODUCT

(75) Inventors: Michael James Vincent, Pleasanton, CA (US); Hershel Edward Fancher, New Albany, IN (US); David Anthony Harpring; Patrick Joseph Ogburn, both of Louisville, KY (US)

(73) Assignee: Grand Soft Equipment Co., Louisville, KY (US)

( * ) Notice: Subject to any disclaimer, the term of this patent is extended or adjusted under 35 U.S.C. 154(b) by 0 days.

(21) Appl. No.: 09/353,983

(22) Filed: Jul. 15, 1999

(51) Int. Cl.[7] .................................................. B65D 35/28
(52) U.S. Cl. .................... 222/95; 222/105; 222/146.6; 222/327
(58) Field of Search .................. 222/95, 105, 146.6, 222/326, 327, 386, 561

(56) References Cited

U.S. PATENT DOCUMENTS

| | | | |
|---|---|---|---|
| 2,838,210 | * | 6/1958 | Detrie et al. . |
| 2,887,072 | * | 5/1959 | Watkins . |
| 3,472,433 | * | 10/1969 | Thomas . |
| 4,304,341 | * | 12/1981 | Shirley . |
| 4,452,823 | * | 6/1984 | Connolly et al. . |
| 5,069,364 | * | 12/1991 | McGill . |
| 5,149,551 | * | 9/1992 | Anderson . |
| 5,150,820 | * | 9/1992 | McGill . |
| 5,215,222 | * | 6/1993 | McGill . |
| 5,265,764 | * | 11/1993 | Rowe et al. . |
| 5,305,923 | * | 4/1994 | Kirschner et al. . |
| 5,405,054 | * | 4/1995 | Thomas .............................. 222/146.6 |
| 5,407,093 | | 4/1995 | McGill . |
| 5,417,355 | * | 5/1995 | Broussalian et al. . |
| 5,421,484 | * | 6/1995 | Beach . |
| 5,462,201 | * | 10/1995 | Wilkins . |
| 5,463,878 | * | 11/1995 | Parekh et al. . |
| 5,464,120 | * | 11/1995 | Alpers et al. . |
| 5,492,249 | * | 2/1996 | Beach .............................. 222/146.6 |
| 5,494,193 | * | 2/1996 | Kirschner et al. . |
| 5,501,368 | * | 3/1996 | Brandhorst et al. . |
| 5,505,336 | * | 4/1996 | Montgomery et al. . |
| 5,620,115 | | 4/1997 | McGill . |
| 5,749,240 | | 5/1998 | McGill . |
| 5,816,455 | * | 10/1998 | Alpers et al. . |
| 5,913,342 | | 6/1999 | McGill . |

FOREIGN PATENT DOCUMENTS 0 285 709 A1 * 10/1988 (EP) .

* cited by examiner

Primary Examiner—Joseph A. Kaufman
(74) Attorney, Agent, or Firm—Dorr, Carson, Sloan & Birney, P.C.

(57) ABSTRACT

A system dispenses a desired portion of frozen product at a uniform rate from a product container containing the frozen product. The product container has a spout, and a dispensing valve connected to the spout to seal the product container. The dispensing valve is used to control dispensing of the frozen product from the product container. A label, attached to the product container identifying the formulation of the frozen product, is read to determine at least the formulation of the frozen product. Based upon at least the formulation, a controller controls the applied force from a drive and applied the force to a piston in the product container in order to dispense the frozen product at a uniform rate. The force is adjusted by the controller such that the frozen product is dispensed at a uniform rate until the desired portion is dispensed. The product container is sufficiently rigid so as not to deform when the force is applied to dispense the frozen product. The product container is also sufficiently deformable so that the product container is collapsible when it is empty of frozen product. Further, a product volume sensor is provided to determine the amount of frozen product in the product container and when the product container is empty of frozen product.

16 Claims, 14 Drawing Sheets

*Fig. 8*
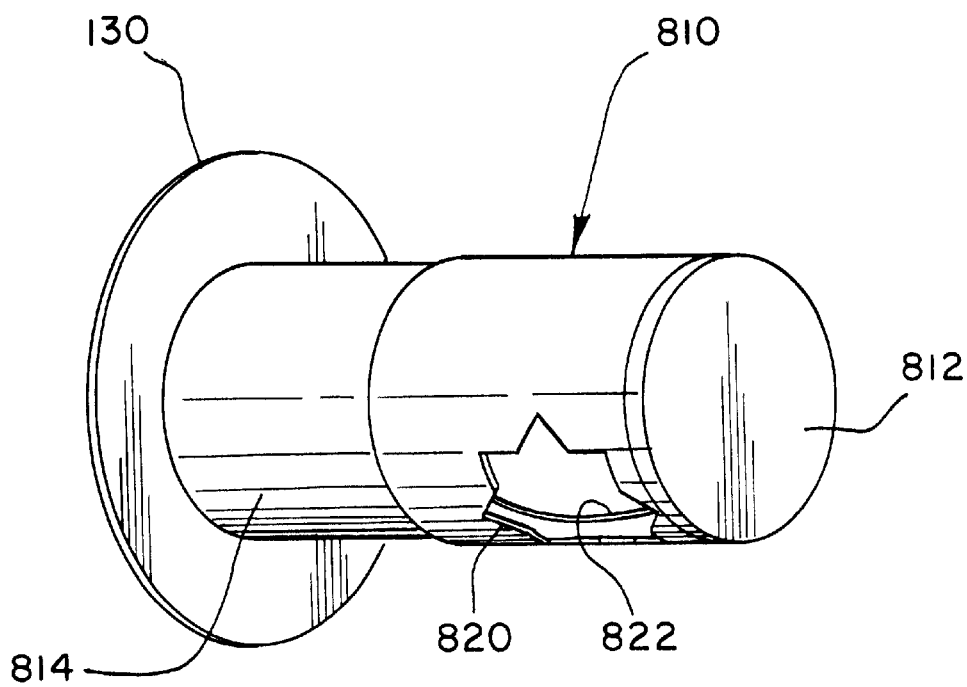
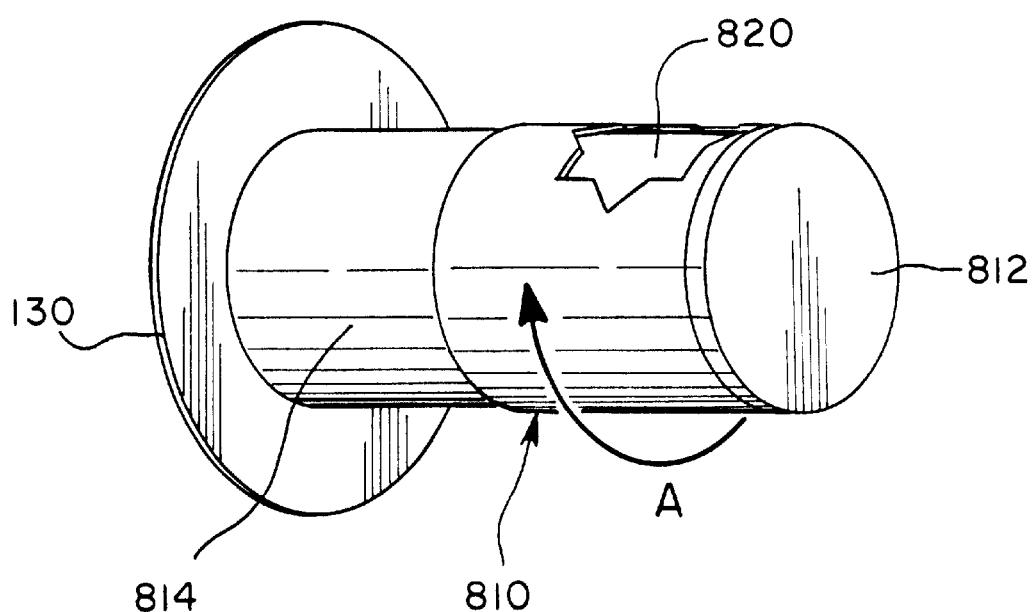
*Fig. 9*

APPARATUS AND METHOD FOR DISPENSING A DESIRED PORTION OF FROZEN PRODUCT

BACKGROUND OF THE INVENTION

1. Field of the Invention

The present invention relates to an apparatus and method for dispensing a frozen product, and more particularly, for an apparatus and method using a product container having a control valve that dispenses the frozen product in a desired shape at a uniform rate and quantity.

2. Statement of the Problem

A wide variety of dispensing systems are used to dispense frozen product (such as, ice cream and/or frozen yogurt). In one conventional configuration, as shown in U.S. Pat. No. 5,417,355, the frozen product is housed within a product container, typically a cardboard container having a cylindrical shape. A drive motor or source of high pressure air moves a piston to apply a drive force. The force causes the piston to directly contact a portion of the container (i.e., a lid) or the frozen product itself such that frozen product is pushed through the container and out a spout in the dispensing system. In another conventional configuration, the dispensing system uses a deformable container that contains the frozen product. The deformable container also includes a spout, and the deformable container can have an "accordion-like" structure (as shown in U.S. Pat. No. 5,505,336) or a flexible bag structure (as shown in U.S. Pat. Nos. 5,463,878, 5,265,764 and 5,421,484). In this configuration, the drive force causes the piston to directly contact the deformable container to extrude the frozen product from the spout. In yet another conventional configuration, as shown in U.S. Pat. No. 5,385,464, the dispensing system uses a product container to house the frozen product. An automated system is used to scoop and dispense the frozen product from the container. In all of these conventional systems, the frozen product is not dispensed at a uniform rate primarily due to the formulation and temperature of the frozen product that is dispensed. Hence, the frozen product is dispensed at varying rates and, as such it is difficult for an operator of the dispensing system to easily dispense a specifically desired amount of the frozen product. Therefore, a need exists to provide a system that dispenses frozen product at a uniform rate regardless of the formulation.

Further, since these conventional systems do not dispense the frozen product at a uniform rate, the dispensing of a specific portion is difficult. The portion control is difficult because the flow rate typically varies according to the formulation, viscosity, temperature, quality and the consistency of the frozen product. In addition, adding to this difficulty is the compressibility of the frozen product which can be up to about 50% air by volume. In most conventional dispensing systems, there is no portion control. The portion is dispensed by an operator using eyesight control, and the operator of the system cannot consistently gauge the amount of frozen product being dispensed from the system over any given time because the formulation and the temperature of the frozen product periodically change. Therefore, the operator can easily dispense a larger or smaller amount of the frozen product than is desired by the customer. Dispensing a higher amount affects profitability of the system, and dispensing a lower amount causes customer dissatisfaction. Requiring the operator to weigh the frozen product that has been dispensed is not practical in the fast food environment. Such weighing of the frozen product is expensive especially in a high volume commercial operation. Further, while weighing protects the customer from receiving a shortage, it does not protect the operator when too much is dispensed. In addition, as shown in U.S. Pat. No. 5,464,120, some conventional systems that offer portion control include a metering chamber that is the size of the desired portion and is attached to the spout of the container. The frozen product is extruded into the metering chamber and once the metering chamber is filled, the frozen product is dispensed to the customer. In these systems, the metering chamber must be cleaned and sanitized especially when a different flavor is inserted into the dispensing system. Further, the size of the dispensed portion is dependent upon the size of the metering chamber, and therefore, variable sized portions cannot be dispensed from the dispensing system. As such, a need exists for a system that reliably dispenses a portion that has been purchased by the customer or allows an operator to easily gauge the amount of frozen product that has been dispensed, and such a system should dispense the frozen product at a uniform rate regardless of the formulation of the frozen product and without using additional metering chambers.

Some conventional frozen product dispensing systems, such as the cardboard and deformable container configurations, use a rigid cylindrical support (such as shown in U.S. Pat. Nos. 5,463,878, 5,265,764 and 5,421,484). The forces required to extrude frozen product are large and the sidewalls of such containers are not strong enough to withstand such forces. The cylindrical support provides significant sidewall support during dispensing the frozen product. In these embodiments, the cardboard or flexible container is positioned within the cylindrical support. A piston slidably engages the cylindrical support container and the drive force provided by the motor drive or high pressure air source forces the piston to extrude the frozen product from the container. The use of such a support is expensive and a need exists to eliminate the use of such a support by providing a frozen product container having sufficient sidewall strength to withstand the drive forces.

When the frozen product container is housed within the cylindrical support, it is difficult to determine when the frozen product container is empty. As such, there are times when the frozen product container is replaced before it is empty of frozen product, and thus, frozen product is wasted. Therefore, a need exists for a system that detects when a product container is empty.

In some conventional frozen product dispensing systems, caps and valves are connected to the spout on the frozen product container to perform particular tasks. For example, a stopper cap is connected to the spout after the container is filled with product during a fill procedure. The stopper cap seals the product in the container after the filling procedure and during freezing and transportation of the container. When the container is loaded into a dispensing system, the stopper cap is removed from the spout and discarded. A dispensing valve is then attached to the spout. The dispensing valve allows frozen product to be dispensed from the spout when force is applied to the container by the plunger. Typically, the dispensing valve is an integral part of the dispensing system and is used for each container that is placed in the dispensing system. This use of the dispensing valve presents sanitary problems if the dispensing valve is not properly cleaned when new frozen product containers are added. Further, when the frozen product contains chunks of fruit, nuts, chocolate or other ingredients, the dispensing valve can become clogged. As a result, the dispensing spout is frequently removed and cleaned adding to the costs of the dispensing operation. Thus, a need exists for a single valve as part of the frozen product container that seals the container after filling, dispenses the frozen product, and is thrown away with the empty container.

Therefore, a need exists for a frozen product dispensing system that dispenses the frozen product at a uniform rate regardless of the formulation of the frozen product. A need exists for a dispensing system that can dispense a specified portion purchased by a customer. In addition, a need exists for a frozen product container that has sufficient sidewalls strength to withstand forces required to extrude the frozen product from the dispensing system. A need also exists for a container that is collapsible after use to minimize the volume of refuse. Further, a need exits for a dispensing system that detects when the frozen product container is empty. Also, a need exists for a single dispensing valve that is installed to seal the container after filling and is also used as the dispensing spout during dispensing the frozen product. In addition, a need exists for a single dispensing valve that eliminates costs associated with disassembly and sanitation.

SUMMARY OF THE INVENTION

1. Solution to the Problem.

The present invention solves the problems mentioned above and other problems associated with dispensing frozen product. The present invention includes a dispensing system that dispenses frozen product at a uniform rate regardless of, at least, the formulation, percent by volume of air, quality of the frozen product and temperature of the frozen product. The present invention includes a dispensing system that dispenses a specified portion purchased by a customer. The present invention provides a dispensing system that uses a product container that collapses when empty, and yet has sufficient sidewall support to withstand dispensing without external support around the container. Further, the present invention provides a dispensing system that detects when the frozen product container is empty. In addition, the present invention also provides a single dispensing valve in the container that can be attached to the product container before or after filling, and the dispensing valve can used for filling and for dispensing the frozen product so as to eliminate cleaning of conventional spouts that are part of the dispensing system.

2. Summary.

The present invention includes a frozen product dispensing system for dispensing a desired portion of frozen product. The dispensing system includes a product container positioned within the dispensing system and containing the frozen product. The product container also includes a spout. A single dispensing valve is connected to the spout before or after the product container is filled with frozen product to seal the frozen product in the product container, and the dispensing valve is also used to control dispensing of the frozen product from the product container.

A label or other identifier is attached to the product container identifying the formulation of the frozen product contained within the product container. A controller is provided in the dispensing system. A reader is connected to the controller and reads the label. The reader allows the controller to determine and/or display the formulation and other information relating to the frozen product contained within the product container. A drive is connected to the controller, and the drive applies force to the product container. The controller uses various techniques to dispense the frozen product from the product container at a uniform rate. Further, the controller also uses these techniques to dispense a desired portion from the dispensing system.

In addition, the product container has sufficient sidewall strength such that the product container is not deformed when the force applied to dispense the frozen product from the spout. Yet, the product container is also sufficiently deformable that the product container is collapsible when it is empty of frozen product. Further, a product volume sensor is provided and is connected to the controller. The product volume sensor determines when the product container is empty of frozen product. In addition, the product volume sensor can supply volume information to the controller such that the volume of frozen product in the product container is displayed.

BRIEF DESCRIPTION OF THE DRAWINGS

FIG. 8 is a perspective view of yet another embodiment of a dispensing valve of the present invention in an open position;

FIG. 9 is a perspective view of yet another embodiment of a dispensing valve of the present invention in a closed position;

DETAILED DESCRIPTION OF THE INVENTION

1. Overview.

Figure 1:
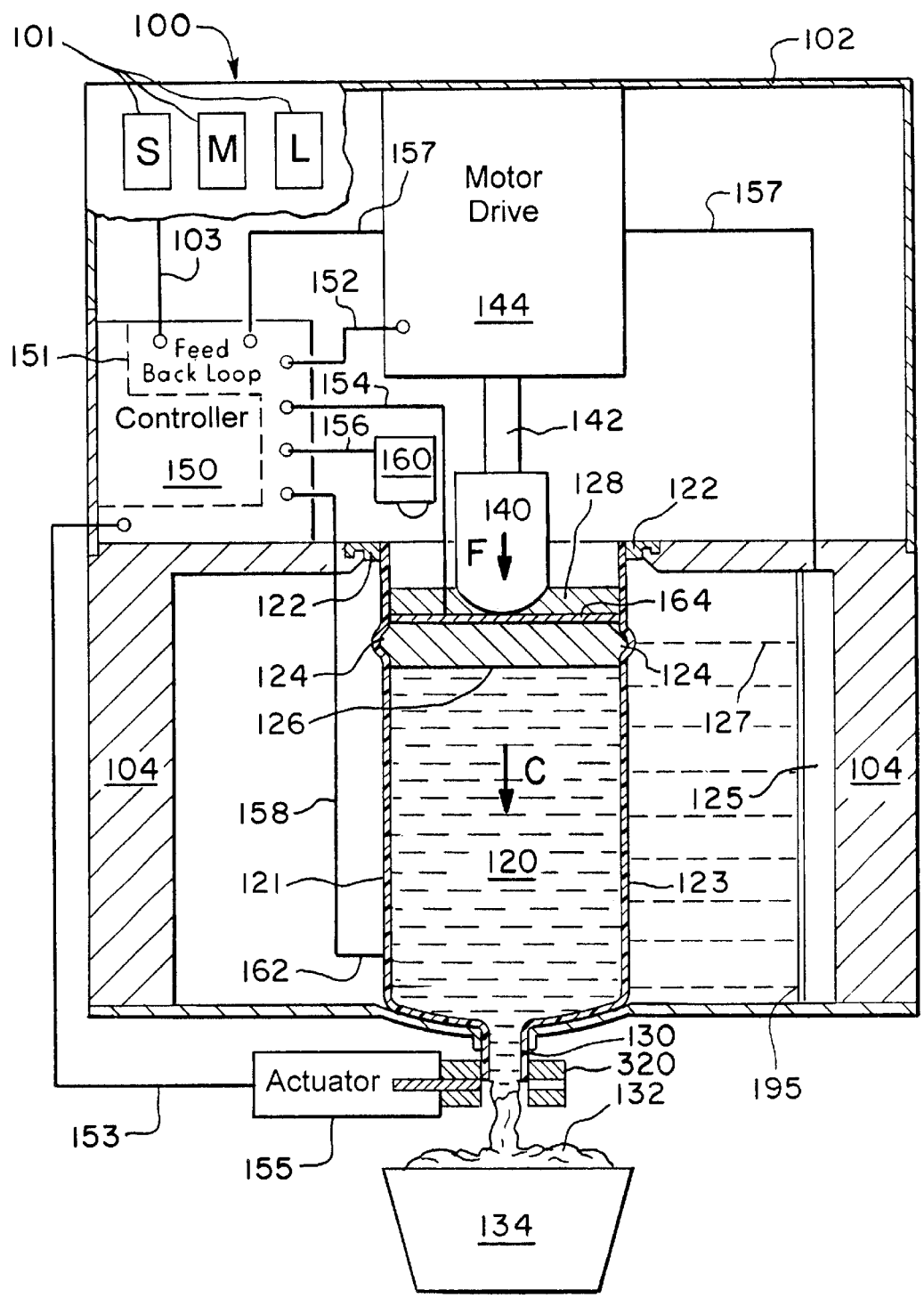
FIG. 1 is an illustration showing the major components of an embodiment of the frozen product dispensing system of the present invention.

In FIG. 1, a frozen product dispensing system 100 is illustrated. The dispensing system 100 is used to dispense frozen product 132 such as, for example, ice cream, frozen yogurt or any other frozen confectionery product or dessert that is dispensed for consumption from a product container 120 into a server 134, such as a cup. In one embodiment, a customer purchases a desired amount of frozen product 132 and an operator uses the dispensing system 100 to dispense the desired amount. The frozen product 132 is dispensed from the dispensing system 100 at a uniform rate by adjusting the force (F) applied to piston 126 after monitoring a variety of parameters associated with the frozen product 132.

In another embodiment, the dispensing system 100 automatically dispenses the frozen product 132. In this embodiment, a customer purchases a desired amount of frozen product by inserting a predetermined amount of money into the dispensing system 100. A force is applied to the piston 126. The force is monitored and adjusted according to various parameters associated with the frozen product 132. In particular, the force is applied for a specified period of time to dispense the desired amount. In addition, the linear displacement of the piston 126 is measured to determine the amount of frozen product 132 dispensed from the product container 120. The dispensing system 100 then automatically dispenses at a uniform rate the desired amount of frozen product 132 to the customer.

The present invention, generally, dispenses frozen product 132 at a uniform rate from dispensing system 100. The present invention provides an apparatus and associated method for dispensing a specified desired portion of frozen product 132 via a product container 120 that requires no sidewall 121 and 123 support. In addition, the dispensing system 100 monitors a variety of parameters such that the volume of the product container 120 is determined. Further, the present invention also overcomes the aforementioned problems associated with other systems that have been used in the art.

2. Dispensing System

In FIG. 1, the dispensing system 100 includes a product container 120 having a spout 130. The product container 120 contains frozen product 132, and resides in housing 102. Additionally, the product container 120 engages a retaining ring 122 that is releasably attached to support 104 that is connected to the housing 102. The retaining ring 122 and the support 104 ensure that the product container 120 is positioned in a vertical dispensing orientation, as shown in FIG. 1. In this position, the spout 130 extends from the housing 102. A dispensing valve 320 is connected to the spout 130 to regulate the flow of the frozen product 132. The server 134 is placed below the spout 130 and dispensing valve 320 during dispensing the frozen product 132. The server 134 can be automatically placed below the spout 130 and dispensing valve 320 by the system 100 or an operator can manually place the server 134 below the spout 130 and dispensing valve 320. The product container 120 is removable from the housing 102. For example, when the product container 120 is empty of frozen product 132, the product container 120 can be removed and replaced by a new container (not shown) in the dispensing configuration shown in FIG. 1. The positioning of the product container 120 is aided by a retaining ring 122 that is connected to the product container 120. The retaining ring 122 is releasably held in place by the support 104 using a complementary fitting arrangement as described below.

In FIG. 1, all the components used to dispense the frozen product 132, in a first embodiment, are contained within the housing 102. However, it should be appreciated that particular components, such as the controller 150 and the motor drive 144, in a second embodiment, could optionally be housed outside the housing 102. Also, in another embodiment, the refrigeration housing 102 can house a plurality of product containers 120. In FIG. 1, the dispensing system 100 of the present invention is illustrated and is not limited to any one of the numerous conventional designs for providing a refrigeration housing 102 around the product container.

Further, the housing 102 typically encloses the product container 120 and maintains the product container 120 at a constant temperature. As such, the housing 102 can, essentially, be a refrigerator having a refrigerant (not shown), a compressor (not shown) and a temperature control system (not shown) to maintain a constant temperature environment inside housing 102. However, the present invention should not be interpreted as being limited by the refrigeration mechanisms described herein, and the present invention should encompass other refrigeration mechanisms known in the art. In one embodiment, the temperature inside the housing 102 is controlled by the controller 150 such that the frozen product 132 is maintained at a constant temperature ranging from about 15 to 20° F. It should be understood that, in one embodiment, the controller 150 can adjust the temperature inside the housing 102 because the controller is connected to the temperature control system (not shown) of the housing 102. In addition, the temperature control system (not shown) can include fans (not shown) and defrost components (not shown.

Also shown in FIG. 1, the dispensing system 100 includes a plunger 140 that is connected to a motor drive 144 via shaft 142. In one embodiment, the motor drive 144 is electrically powered and mechanically driven. In another embodiment, the motor drive 144 comprises a source of highly pressured air. The plunger 140 abuts piston 126 that is positioned in the product container 120, and in the embodiment shown in FIG. 1, the piston 140 contacts a force distribution disk 128 such that any force that is applied to the piston 126 is equally distributed about the full area of the piston 126.

Figure 2C:
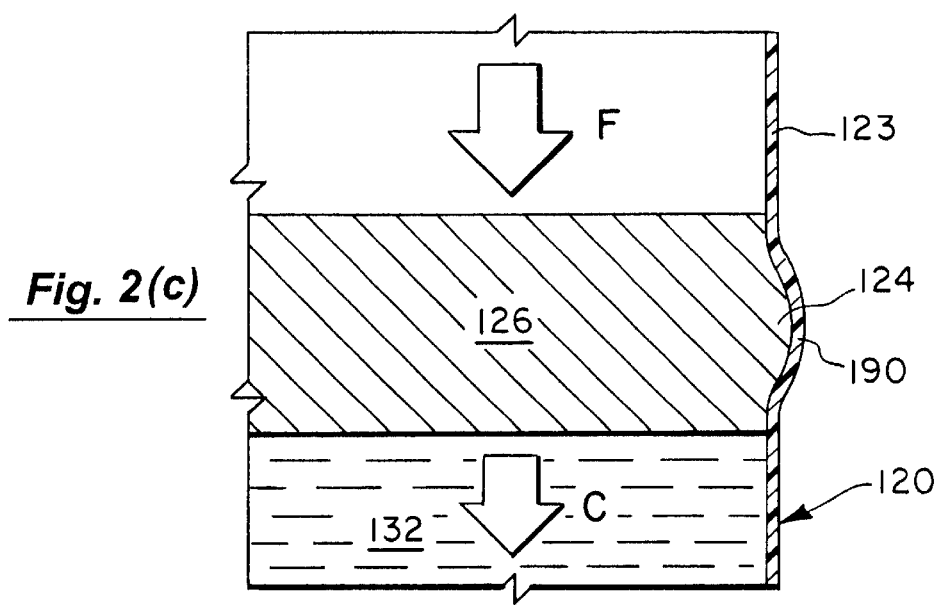
FIG. 2c is a cross-sectional cut-away view of the piston used in the present invention.
Figure 2:
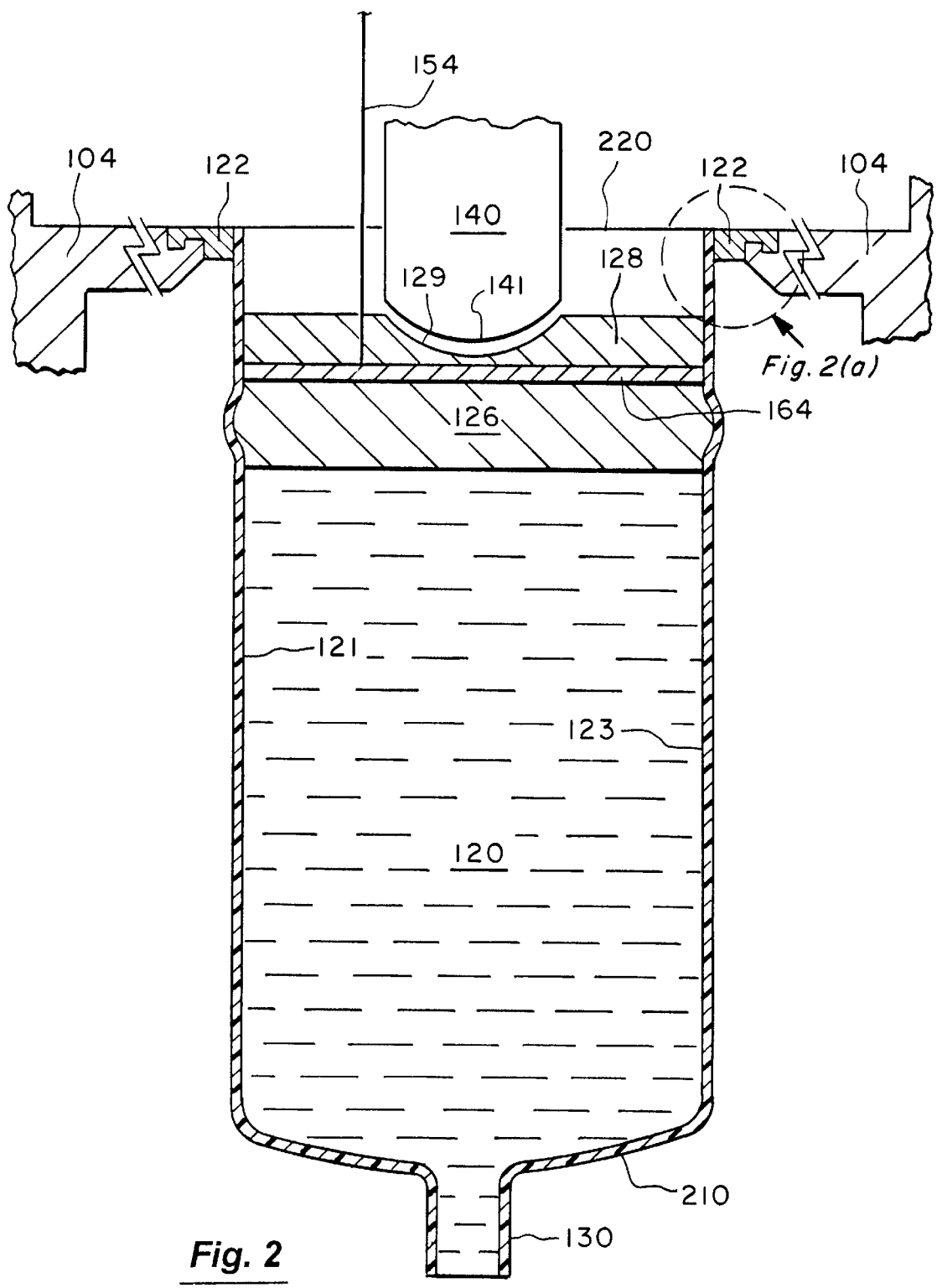
FIG. 2 is a cross-sectional view of the frozen product container of the present invention.

In FIGS. 1 and 2, the plunger 140 is shown being smaller than the piston 126, therefore, requiring a force distribution disk 128. In this embodiment, the plunger 140 has a formed end 141, and the force distribution disk 128 has a formed cavity 129. Thus, when the formed end 141 is positioned within the formed cavity 129 a positive seat is formed that allows the force (F) to be applied about the entire area of the piston 126, Additionally, in this embodiment, the force distribution disk 128 is placed between the piston 126 and the plunger 140. However, it should also be appreciated that the plunger 140 can optionally have a different configuration or shape such that the force applied by the drive motor 144 is equally distributed about the perimeter of the piston 126. In one embodiment, the plunger 140 is configured to be approximately the same size as the piston 126. In this configuration, the plunger 140 exerts force around the entire area of the piston 126 and the force distribution disk 128 is not required. In another embodiment, the plunger 140 has a tapered configuration wherein the end connected to the shaft 142 is approximately the size of shaft 142 and the end that contacts the piston 126 is approximately the same size as the piston 126. Again, in this embodiment, the plunger 140 is capable of exerting a force around the entire area of the piston 126 and the force distribution disk 128 is not required. It should be appreciated that the present invention is not limited as to the size or the shape of the plunger 140, how the plunger 140 engages the piston 126, and whether or not a force distribution disk 128 is used.

The dispensing system 100 also includes a controller 150 that is used to control the dispensing of the frozen product 132. It should be noted that the controller 150 is not, typically, located in the housing 102. Typically, the wires 152, 154, 156, 157 and 158 enter the housing 102 while the controller 150 is located outside housing 102. The controller 150 is typically a microprocessor-based computer having an associated memory. The controller 150 can execute programs that involve dispensing the frozen product, and the controller 150 can monitor input parameters and adjust output parameters accordingly, as will be discussed subsequently. The controller 150 can be any commercially-available device or a device specially designed for this application that performs the function described above and other functions.

a. Temperature

The controller 150 is connected to a temperature sensor 162 via line 158. The temperature sensor 162 monitors the temperature of the frozen product 132 in the product container 120. For example, the temperature sensor 162 can comprise a thermistor or a thermocouple that provide a resistance or a voltage signal, respectively, to the controller 150 in response to the temperature. Accordingly, the temperature sensor 162 is commercially-available temperature measuring device that proves an output signal that can be read or interpreted by the controller 150. The temperature of the frozen product 132 is measured by placing the temperature sensor proximate to or touching the product container 120. Since the housing 102 is maintained in a constant temperature and the frozen product 132 is tempered, this proximate location gives an accurate reading of the temperature of the frozen product 132 without actually having the temperature sensor 162 directly contact the frozen product.

b. Information on Container

The controller is also connected to a reader 160 through line 156. The reader 160 identifies information about the frozen product 132 on label 170. The label 170 is sensed by the reader 160 provides information to the controller 150 that, in part, allows the dispensing system 100 to dispense frozen product 132 at a uniform rate regardless of the formulation of the frozen product.

Figure 1A:
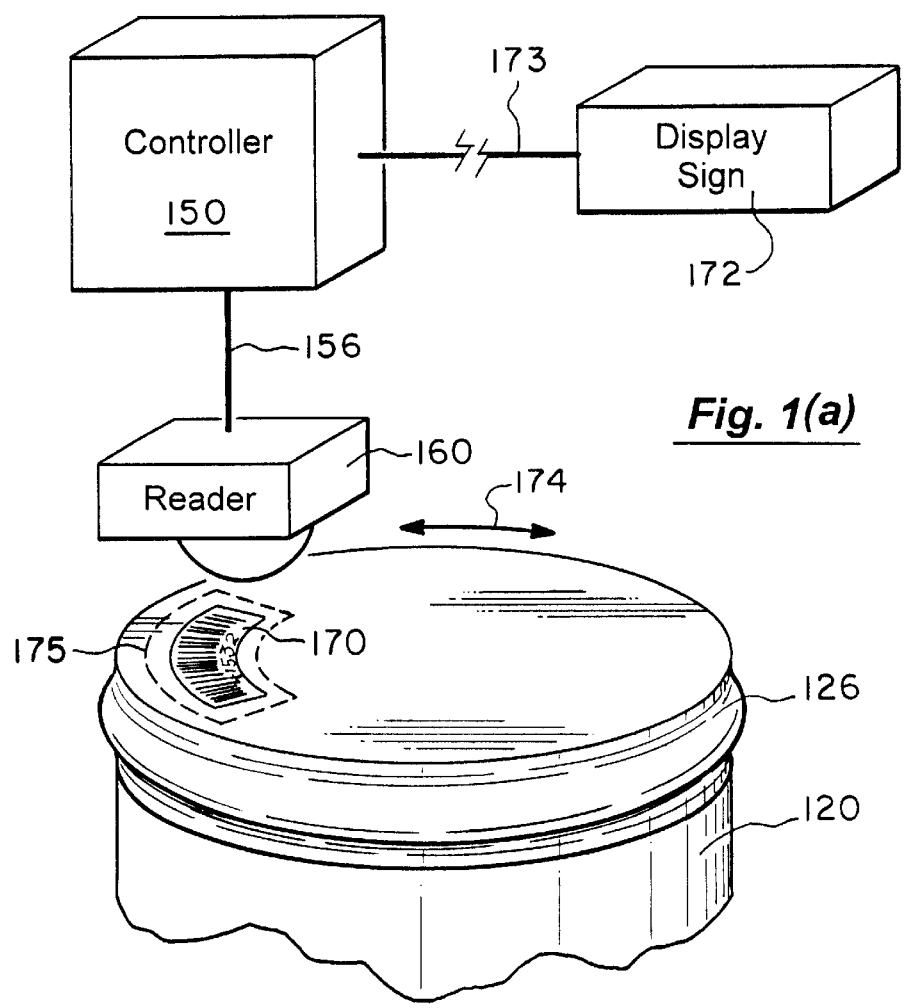
FIG. 1a is a perspective view illustrating a product identification label used in the present invention.

In one embodiment, as shown in FIG. 1a, the information is contained on label 170 attached to the product container 120 in a predetermined area 175. When the product container 120 is installed in the dispensing system 100, the product container 120 is oriented as indicated by arrows 174 such that the reader 160 senses the label 170. In FIG. 1(a), the label 170 is shown attached to piston 126 in predetermined area 175. In another embodiment, the label 170 is attached to a non-moving portion of the product container 120, such as, for example, a sidewall 121 or 123. In another embodiment, the label 170 is attached to a tag (no shown) that is connected to the product container 120.

The information from the label 170 is read by the reader 160 and supplied to the controller via line 156. The information contained in label 170 can comprise any suitable information including the formulation of the frozen product 132. Once the controller 150 receives the information on the label 170, it correlates that information to parameters stored in memory in controller 150 in order to dispense the frozen product 132 at a uniform rate. The parameters adjusted by the controller 150 can include the force (F) applied to the piston 126 and/or the compressibility of the frozen product 132. In one embodiment, the information contained in the label 170 includes an indicator that correlates to the parameters stored in associated memory. The parameters corresponding to the information on label 170 are then used to dispense the frozen product 132 at a uniform rate. In another embodiment, the label 170 comprises a force value and/or a rate of linear displacement of the piston 126 that is associated with a dispense rate that is used to dispense the frozen product 132 at a uniform rate. In one aspect of this embodiment, no correlation in memory occurs. In even another embodiment, the information on label 170 comprises or correlates to a maximum and minimum force that can be applied to the piston 126. In yet another embodiment, the information contained in the label 170 includes product information that is supplied to a display sign 172 through the controller 150 via line 173. The product information is displayed to customers through the display sign 172 that is attached to the housing 102. The product information includes the formulation (such as, chocolate fudge) which is displayed on the display sign 172.

The reader 160 is a device that obtains information from the label 170. In one embodiment, the reader 160 comprises a bar code reader that reads a barcode label 170 that is attached to or is supplied with the product container 120 in area 172. In another embodiment, the reader 160 comprises a radio-frequency reader and the label 170 comprises a passive or active radio-frequency transducer or tag. In one aspect of this embodiment, the radio-frequency transducer provides the information to the radio-frequency reader 160 when the radio-frequency transducer is placed proximately to the radio-frequency monitor, such as during installation of the product container 120. It is to be expressly understood that any conventional data media 170 such as, for example, magnetic data storage tape attached to the container 120 and positioned in predetermined area 172 could be used wherein a suitable reader 160 conveys information concerning the frozen product 132 to the controller 150. The information could be in any suitable data format and could include any of the following: the product formulation, the product identity, a constant value, a force value, etc.

c. Force Sensor

As shown in FIGS. 1 and 2, the controller 150 is also connected via line 152 to the motor drive 144 and by line 154 to a force sensor 164. As such, the controller 150 monitors the force (F) over line 154 applied to the piston 126 by the motor drive 144 and adjusts the force as discussed above. It should be noted that in another embodiment the force sensor 164 is an integral component of the motor drive 144, and thus the line 154 is eliminated. As explained above, the motor drive 144 can comprise an electric motor, such as a stepper motor, that is controllable by controller 150. It should also be appreciated that the motor drive 144 can comprise any commercially-available drive mechanism that can be controlled by controller 150. In FIG. 1, the force sensor 164 and motor drive 144 are located within the housing 102. However, in a preferred embodiment, the motor drive 144 including the integral force sensor 164 are located outside the housing 102 so that the refrigeration in the housing 102 does not cause errors in the force measurement due to temperature variations.

Further, the force sensor 164 can comprise a force-sensitive metallic sensor such as, for example, a strain gauge or any other commercially-available force sensor. In addition, it should also be appreciated that the force sensor 164, as shown in FIGS. 1 and 2, is positioned between the force distribution disk 128 and the piston 126. However, the force sensor 164 can optionally be positioned between the plunger 140 and the force distribution disk 128. In another embodiment, the force sensor 164 is attached to the plunger 140. In even another embodiment, the force sensor 164 is included as an integral component within the drive motor 144. When using the force distribution disk 128, the force sensor 164 can be optionally placed between the force distribution disk 128 and the piston 126 (as shown in FIGS. 1 and 2), or the force sensor 164 can be placed between the plunger 140 and the force distribution disk 128. In the latter configuration, the force sensor 164 can optionally be attached to the formed end 141 of the plunger 140. When a force distribution disk 128 is not used, the force sensor 164 is placed between the plunger 140 and the piston 126, and the force sensor 164 can optionally be attached to the plunger 140. Any number of conventional approaches could be used to measure the force actually being applied by the plunger 140 so that the system is assured that the correct force (F) as determined by the information in label 170 is delivered.

d. Product Container Position

Figure 2A:
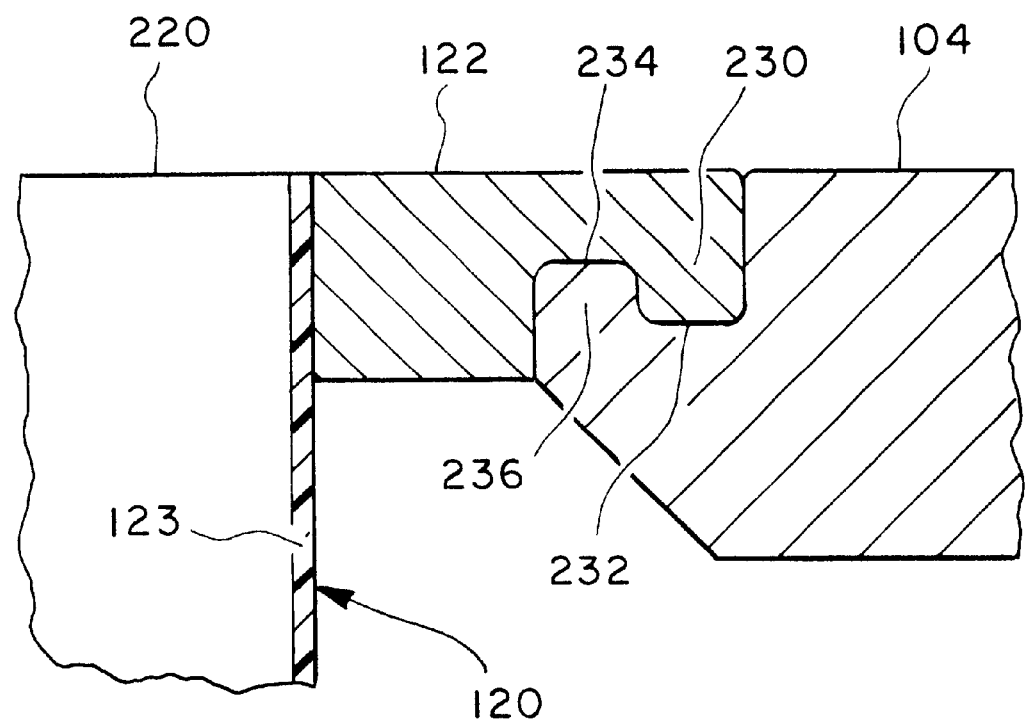
FIG. 2a is a cross-sectional view of the retaining ring used in the present invention.

As shown in FIGS. 1 and 2, in dispensing the frozen product 132, the product container 120 is positioned within the housing 102 in a dispensing orientation that has the retaining ring 122 securely fixed to support 104. The retaining ring 122 is secured to support 104 connected to housing 102 such that the piston 126 can move within the product container 120 while the sidewalls 121 and 123 of the product container 120 do not move. As shown in FIG. 2a, the retaining ring 122 is connected to the second end 220 of the product container 120. The retaining ring 122 includes a retaining ring tongue 230 and a retaining ring groove 234. The support 104 has a complementary-type fitting that includes a fixed support groove 232 and a fixed support tongue 236. When the product container 120 is placed in the housing 102, the retaining ring tongue 230 is releasably positioned in the fixed support groove 232 and the fixed support tongue 236 is positioned in the retaining ring groove 234. This complementary connection allows the product container 120 to receive the plunger 140 and the force (F) that is applied to the piston 126 without collapsing the product container 120 during extrusion as will be subsequently explained. In one embodiment, the retaining ring 122 is composed of, for example, thermoplastic, nylon or polypropylene or any other suitable polymeric material.

It should be noted that the embodiment shown in FIGS. 1, 2 and 2a represent one mechanism used to secure the product container 120 in the dispensing position. However, it should be appreciated that the present invention is not limited to the embodiment shown and should encompass any mechanism know or used in the art for maintaining the product container 120 in a dispensing position.

d. Dispensing Frozen Product

The spout 130 is in an opposite position from the piston 126, and the spout 130 extends from the interior of housing 102 to the exterior. In addition, as the motor drive 144 moves the plunger 140 to apply force (F) to the piston 126, the piston 126 moves toward the spout 130 and compresses (C), as shown in FIG. 1, the frozen product 132 within the product container 120. It should be noted that the frozen product 132 can be compressed by about 35 to 40% without frozen product 132 being extruded from the spout 130. This compression of the frozen product 132 is caused in part because the frozen product contains high amounts of air within the frozen product 132. Once the air has been compressed, any further force applied to the plunger 140 will cause frozen product 132 to be extruded from the spout 130 into the server 134.

It should also be noted that the amount of compression (C) of the frozen product 132 before extrusion is dependent upon the formulation of the frozen product 132. In addition, the compressibility (C) of the frozen product 132 can cause a time lag between the time that the force (F) is applied and when the frozen product 132 is dispensed through the spout 130. Therefore, once the formulation of the frozen product and/or other associated information is input to the controller 150, the controller 150 determines the correct force (F) that must be applied to the piston 126 based on the input information. In one embodiment, this force (F) can be used to pre-load the frozen product 132 so as to eliminate any air located in the frozen product 132 and the time lag associated with compressibility (C) of the frozen product 132.

In addition, to dispense the frozen product 132 the controller 150 instructs the drive motor 144 to apply the a required force above and beyond the preload force (F) for the required amount of time and/or the required linear displacement of the piston 126 based on the programmed information such that the frozen product 132 is dispensed from the spout 130. Also, in another embodiment, the controller 150 instructs the drive motor 144 to apply the required force (F) to dispense the frozen product 132 at a uniform rate and an operator dispenses a desired portion of the frozen product 132. After a period of inactivity, the controller 150 can reduce the pre-load force (F) to prevent loss, run-off or phase transformation of the frozen product 132. The pre-load force (F) and the amount of reduction can be included in the information on the label 170 or correlated with the information on the label 170. In addition, the reduction of the pre-load force (F) can be independent of the information contained in the label 170. As mentioned previously, the dispensing system 100 can have maximum and minimum force limits that can be correlated to the information in label 170 or be independent of the information contained on the label 170.

In another aspect of the present invention, if the force (F) applied to the piston 126 is higher or lower than the maximum and minimum force limits, the dispensing system 100 via the controller 150 can increase or decrease, respectively, the temperature in the housing 102 such that the force (F) that is applied to the piston 126 is within these limits. As mentioned, it should also be appreciated that these maximum and minimum force limits can be associated with the formulation of the frozen product 132 and/or information contained in the label 170.

Generally, the controller 150 continuously monitors the inputs of the temperature sensor 162, the reader 160, the force (F) applied to the piston 126 and the linear displacement of the piston 126 to adjust the force (F) that is to be applied to the piston 126 by the drive motor 144 such that the frozen product 132 is dispensed at a uniform rate. Further, the controller 150 monitors the applied force (F) that is supplied to the piston 126 via a force sensor 164. Based on the applied force, temperature, formulation, linear displacement of the piston 126 and other properties of the frozen product 132, the controller 150 instructs the motor drive 144 to adjust the force (F) applied to the piston 126 through the plunger 140. The force (F) is applied such that the frozen product 132 is extruded from the spout 130, and the controller 150 adjusts the force (F) based on the temperature, formulation, force, linear displacement of the piston 126 and other factors such that the frozen product 132 is extruded at a uniform rate from the spout 130.

f. Portion Control

In one embodiment, the controller 150 can also determine the desired amount of frozen product 132 that is to be dispensed from an input by the operator or the customer. In determining the portion size, a plurality of switches, touch pad or other suitable input devices 101 corresponding to various portion sizes such as, for example, small medium and large, can be connected to the controller 150 and optionally located on the housing 102. The input device 101 is shown in FIG. 1 attached to the housing 102. However, it should be appreciated that the input device 101, in another embodiment, can be located externally from the housing 102. The input device 101 via line 103 triggers an instruction set in the controller 150 to dispense a specified amount of frozen product 132. The instruction set can include, for example, pre-loading the piston 126 with a force (F); mechanically opening dispensing valve 320 using actuator 155; monitoring the movement and/or linear position of the piston 126 using position sensor 125 until the desired amount is dispensed; and mechanically closing the dispensing valve 320.

It should be noted that, in another embodiment, the time that the dispensing valve 320 is open is measured rather than the position of the piston 126. In this embodiment, the controller 150 determines the amount of force (F) to be applied to the piston 126 over the predetermined amount of time based on a uniform flow rate. In a preferred embodiment, the controller 150 determines the amount of force to apply to the piston 126 which can be above and beyond the pre-load force (F). This added force can be applied until the piston is linearly displaced a predetermined amount or the dispensing valve 320 has been open for a predetermined amount of time. Therefore, once the desired amount is determined, the dispensing system 100 dispenses the amount of frozen product 132 that is desired by applying the force for a predetermined amount of time or until the piston 126 has moved a predetermined linear distance. As such, the system 100 controllably dispenses the desired amount of frozen product 132.

In the present invention, a feedback loop 151 can be used to adjust the force (F) applied to the piston 126 such that the product is continuously dispensed at a uniform rate. As shown in FIG. 1, the feedback loop 151 is part of the controller 150. The feedback loop 151 has control inputs from, at least, the position sensor 125, the motor drive 144, the force sensor 164, the reader 160, the temperature sensor 162 and the actuator 155. In another embodiment, the feedback loop 151 is located externally from the controller 150. It should be appreciated that the feedback loop 151 can have more or less control inputs, and the present invention should not be interpreted as being limited by the number and/or type of control inputs and the location of the feedback loop 151.

In one embodiment, the feedback loop 151 comprises a proportional integral differential (PID) feedback loop implemented by the controller 150 that varies the force (F). In this embodiment, the force (F) applied to the piston 126 can be varied by the controller 150 according to the PID feedback loop 151 using the position of the piston 126 measured by the position sensor 125 as a control signal. In another embodiment, using a PID feedback loop 151 implemented by the controller 150, the force (F) can be held constant while the signal from the force sensor 154 is used as the control signal in the PID feedback loop 151. The control of the linear drive rate of the plunger 140 in conjunction with the control signals mentioned above allow the frozen product 132 to be dispensed at a constant rate. It should be noted that these control loops may require that the piston 126 be pre-loaded with a force (F) such that the air is compressed from the frozen product 132 and the time lag reduced between application of the force and dispensing the frozen product.

It should also be appreciated that in another embodiment the dispensing system 100 can also be manually operated wherein an operator dispenses the desired amount of frozen product 132. In this aspect of the invention, the operator can easily gauge the amount of frozen product 132 that is dispensed because the frozen product 132 is dispensed at a uniform rate regardless of the formulation of the frozen product 132.

g. Product Container

As shown in FIG. 2, the product container 120 includes a retaining ring 122, a piston 126 and a spout 130. The product container 120 is used to contain the frozen product 132. In one embodiment, the product container 120 is composed of a high-strength semi-rigid plastic container, such as, for example, a film laminate that is cylindrical in shape. A first end 210 of the product container 120 is connected to the spout 130. The product container 120 is formed during manufacturing to include the spout 130. As a result, the spout 130 is integrally formed as part of the product container 120 during manufacturing. The second end 220 of the product container 120 is connected to a retaining ring 122 that is secured to support 104. In one embodiment, the retaining ring 122 is plastic and is heat welded to the second end 220 of the product container 120.

In addition, the product container 120 is preferably positioned such that the first end 210 is opposite from the second end 220 in a vertical orientation such that the sidewalls 121 and 123 are positioned below the retaining ring 122. The sidewalls 121 and 123 do not have external support.

As shown in FIG. 1, the second end 220 of the product container 120 contains a piston 126 that moves within the product container 120 as a plunger 140 contacts and applies force (F) to the force distribution disk 128. The piston 126 is an integral part of the product container 120 and serves several functions. The piston 126 is used to compress the frozen product 132 within the product container 120. The piston 126 is also used to seal the second end 220 of the product container 120 during the filling procedure. In one embodiment, the piston 126 is circular and is composed of a hardened plastic material that is able to withstand the force applied to the plunger 140.

Since there is no external support, the sidewalls 121 and 123 can slightly bulge 190 around the raised annular edge 124 when force (F) is applied to the piston 126 as shown in FIG. 2c. However, since the product container 120 is not compressed when force is applied to the piston 126 (i.e., only the frozen product 132 is compressed), the frozen product 132 is dispensed from the spout 130 of the product container 120. Further, it should be noted that the thickness of the sidewalls 121 and 123 of the product container 120 are chosen such that only bulging 190 occurs in the sidewalls 121 and 123 during dispensing of the frozen product 132 is prevented. In one embodiment, the sidewalls 121 and 123 have a thickness ranging from about 3 to 10 mils. As a result of the thickness of sidewalls 121 and 123, the tensile strength of the container 120 and other factors, the product container 120 maintains its shape without using exterior support for the sidewalls 121 and 123. It should be appreciated that the present invention should not be interpreted as being limited by the thickness of the sidewalls 121 and 123 of the product container, and the thickness values disclosed herein are presented as examples only.

In another aspect of the present invention, as the piston 126 moves within the product container 120, the piston 126 contacts the sidewalls 121 and 123 and the frozen product 132. As explained above, the sidewalls 121 and 123 remain substantially vertical during movement of the piston 126 and the frozen product 132 is extruded from the spout 130. The piston 126, as shown in FIG. 2c, includes a raised, slightly curved, annular edge 124 along the circumference of the piston 126. As shown in FIG. 2C, the raised annular edge 124 contacts the internal sides of sidewalls 121 and 123 causing bulge 190 that conforms to the shape of the raise annular edge 124. The shape conformity of the sidewalls 121 and 123 around the raised annular edge 124 allows the piston 126 to wipe and clean the sidewall 121 and 123 of frozen product as the piston 126 moves. Further, the raised annular edge 124 seals the piston 126 in the product container 120 so that frozen product 132 does not squeeze out around the piston 124 as the frozen product 132 is compressed by the force from plunger 140.

Figure 2B:
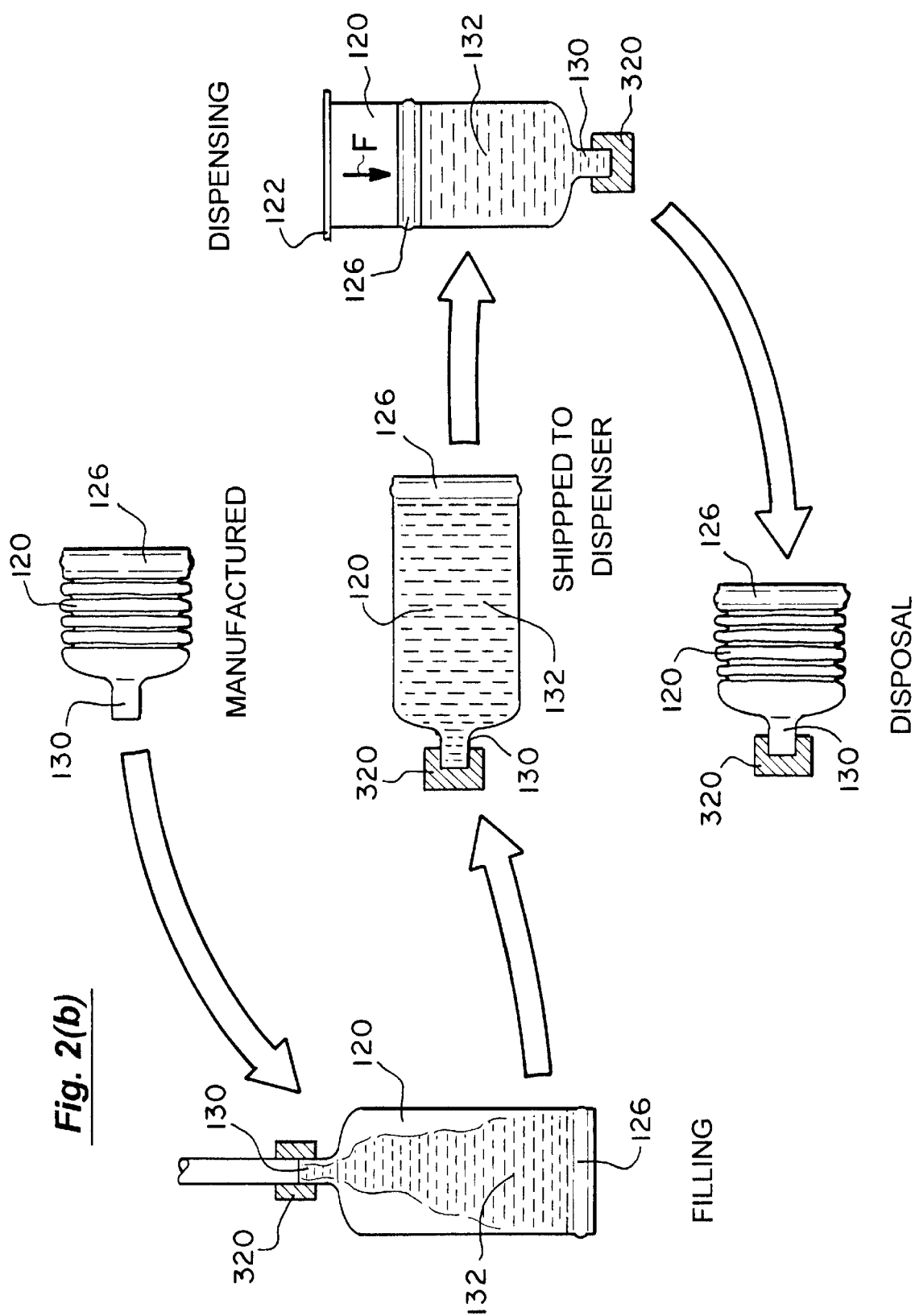
FIG. 2b is an illustration showing the product container at various stages of use in the present invention.

The material characteristics of the product container 120 allow it to take several shape changes from manufacture to disposal. As shown in FIG. 2b, the product container 120 is relatively compact after it is manufactured. When the product container 120 is filled with frozen product 132, the container 120 expands, and once filled the dispensing valve 320 and piston 126 seals the frozen product 132 in the product container 120. It should be noted that in FIG. 2b, the product container 120 is shown as being filled through the dispensing valve 320. However, the product container 120 can also be filled via the piston 126 end of the product container 120. During this filling procedure, the dispensing valve 320 is closed and the piston 126 is removed during filling. After the product container 120 has been filled, the piston 126 is placed in the product container 120.

After the product container 120 is filled, it is, typically, deep frozen (tempered) and then shipped to a dispensing site. At the dispensing site, the container 120 is installed in a dispensing system 100 and the frozen product 132 is dispensed from the product container 120. After all the frozen product 132 has been dispensed from the product container 120, the product container 120 is again collapsed and discarded.

h. Volume Detection

In addition, the position of the piston 126 in the dispensing system 100 provides an indication as to the amount of frozen product 132 that is located in the product container 120 and/or the amount of frozen product 132 that has been dispensed from the product container 120. Further, in one embodiment, the product container 120 has a length in the range of about 10 to 12 inches and a diameter in the range of about 6 to 8 inches and holds about 2 to 2.5 gallons of frozen product 132. In another embodiment, the diameter ranges from 3 to 10 inches and the length ranges from 6 to 24 inches. Given these dimension, the vertical position of the piston 126 corresponds to a specific amount of frozen product 132 in the product container 120. In one embodiment used to monitor the position of the piston 126, the controller 150 determines the distance that the shaft 142 and plunger 140 have traveled during dispensing of the frozen product 132. From this distance, the vertical position of the piston 126 can be determined by the controller 150. Typically, if the motor drive 144 comprises a stepper motor, the controller 150 can determine the position of plunger 140 by counting the "steps" the motor drive 144 moves the shaft 142.

In another embodiment, as shown in FIG. 1, a position sensor 125 having an array of emitters emits a number of beams 127 to monitor the vertical position of the piston 126 and supplies this information to the controller 150 by line 157. In this embodiment, the position sensor 125 emits a number of beams 127 and one of the beams 127 is reflected off the piston 126. In one embodiment, the beams 127 are infrared signals. The position of the piston 126 is determined by the position at which the beam 127 is reflected. From this position, the volume of the frozen product 132 in the product container 120 is determined. In another embodiment, the position sensor 125 can include a single emitter at the lowest position 195 that will indicate when the product container is empty. When the position sensor 125 senses the piston 126 at the lowest position 195, the sensor 125 will indicate that the product container 120 is empty.

The position sensor 125 may be any commercially available sensor that allows for the position of objects to be monitored such as, for example, an infrared detector. The controller 150 is capable of converting the position of the piston 126 to a volume level of frozen product 132 in the product container 120. Therefore, the volume of the frozen product 132 is monitored and a signal may be sent to the operator to indicate that the product container 120 must be replaced via, for example, an indication light (not shown) on the housing 162.

As explained above, the linear position of the piston 126 can also indicate the amount of frozen product 132 that has been dispensed from the product container 120. In this embodiment, the piston is pre-loaded with a force (F) and once the dispensing valve 320 is opened, the linear displacement of the piston 320 corresponds to the amount of the frozen product 132 that has been dispensed from the product container 120.

Further, this volume monitoring by the controller 150 ensures that the product container 120 is not prematurely replaced and, hence, prevents the frozen product 132 from being wasted. Further, the volume monitoring can inform the operator that the product container 120 does not have the amount of frozen product 132 that is desired to be dispensed. In this case, the controller 150 determines the amount that is within the product container 120 and dispenses that amount. The operator is, then, informed by the dispensing system 100 such as, for example, an indication light (not shown) connected to the housing 102 that the product container 120 must be replaced, and after a new product container 120 is added the remainder of the desired portion is added. It should be noted that this procedure is only valid when the empty product container 120 is replaced by a new product container (not shown) having the same formulation of frozen product 132. Further, if the dispensing system 100 is automatically operated such that an operator or technician is not able to replace the product container 120, the customer will not be allowed to choose a product size that is greater than the amount of frozen product 132 located in the product container 120. Therefore, the customer is ensured to receive the full amount of frozen product 132 that is purchased and the product container 120 is replaced only when it is empty.

It should be appreciated that the volume monitoring described herein should not be interpreted to limit the present invention to the embodiments disclosed. Furthermore, the present invention expressly encompasses other techniques known in the art for measuring displacement of the piston 126 and the volume of frozen product 132 in the product container 120.

i. Dispensing Valve

In FIGS. 1, 3–13, several embodiments of a dispensing valve 320 are illustrated. The dispensing valve 320 is attached to the spout 130 of the product container 120. In one embodiment, the dispensing valve is connected to an actuator 155 which is connected via line 153 to the controller 150. The dispensing valve 320 provides several functions. In one function, the dispensing valve 320 is used to seal the frozen product 132 in the product container 120 before or after the product container 120 is filled with frozen product 132, and the dispensing valve 320 also can be used to regulate the flow of frozen product 132 during dispensing.

The dispensing valve 320 includes a valve body 322 that is connected to the spout 130. Typically, the dispensing valve 320 is attached to the spout 130 and is not removable. This attachment is feasible because a single dispensing valve 320 can perform at least two functions that were accomplished by at least two conventional valves in conventional dispensing systems. However, it should be appreciated that, in another embodiment, the dispensing valve 320 can be removably attached to the spout 130. The valve body 322 can optionally have a seal 330 that is positioned between the valve body 322 and the spout 130. The seal 330 prevents frozen product 132 from flowing between the valve body 322 and the spout 130. In one embodiment, the seal 330 is an O-ring seal. In even another embodiment, a fixed adhesive seal between the valve body 320 and the spout 130 prevents any backflow of frozen product 132 between the valve body 320 and the spout 130. In one embodiment, the fixed adhesive seal may be provided by an epoxy or glue-type adhesive.

Figure 6:
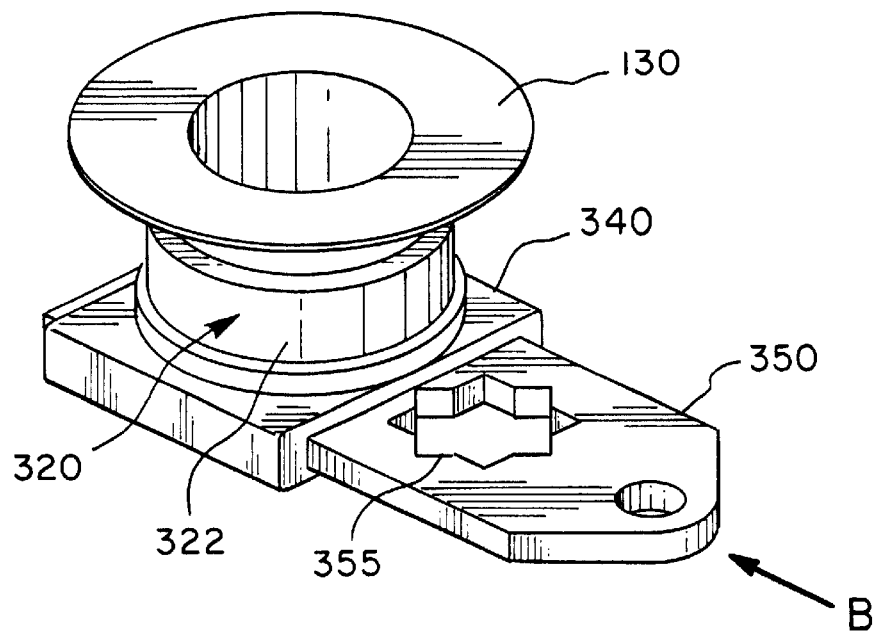
FIG. 6 is a perspective view of a dispensing valve of the present invention in a closed position.

The valve body 322 has a gate housing 340 that extends below the spout end 333. The gate housing 340 accepts a movable gate 350 having a gate opening 355. As shown in FIG. 6 in one embodiment, the gate opening 355 has a star shape. However, it should be appreciated that the shape of the opening 355 can be any shape that is desired such as, for example, a square, a circle, a triangle or an octagon.

Figure 3:
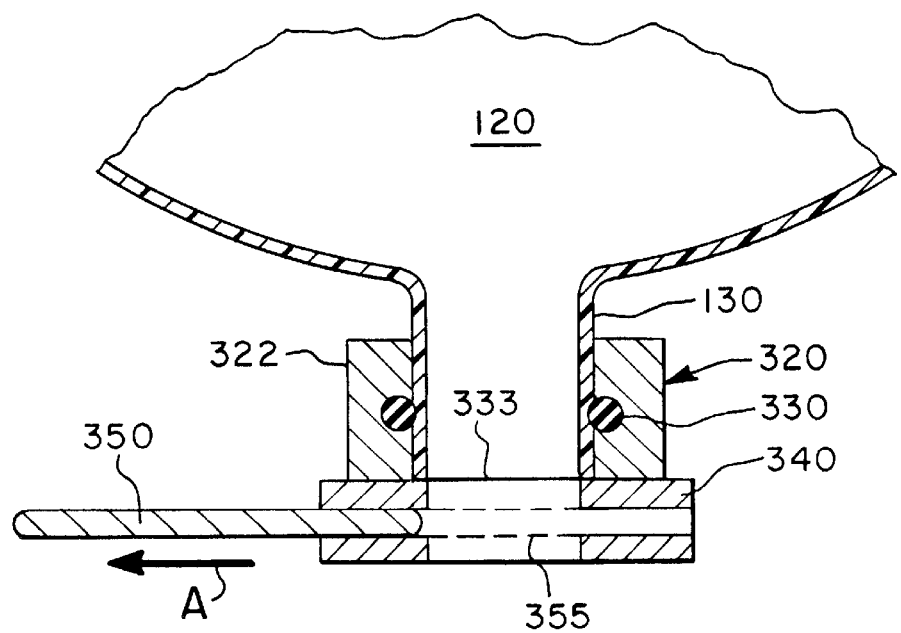
FIG. 3 is a cross-sectional view of an dispensing valve of the present invention in an open position.
Figure 4:
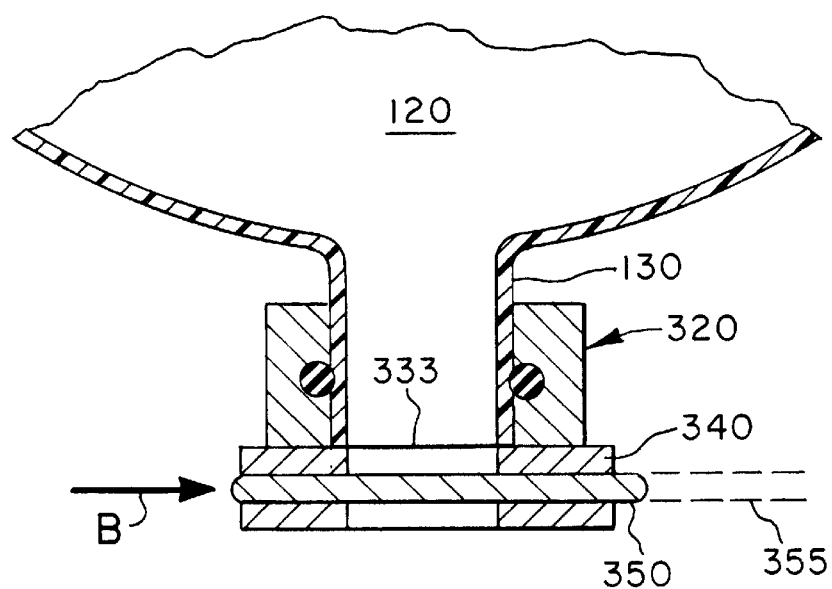
FIG. 4 is a cross-sectional view of a closed dispensing valve of the present invention in a closed position.
Figure 5:
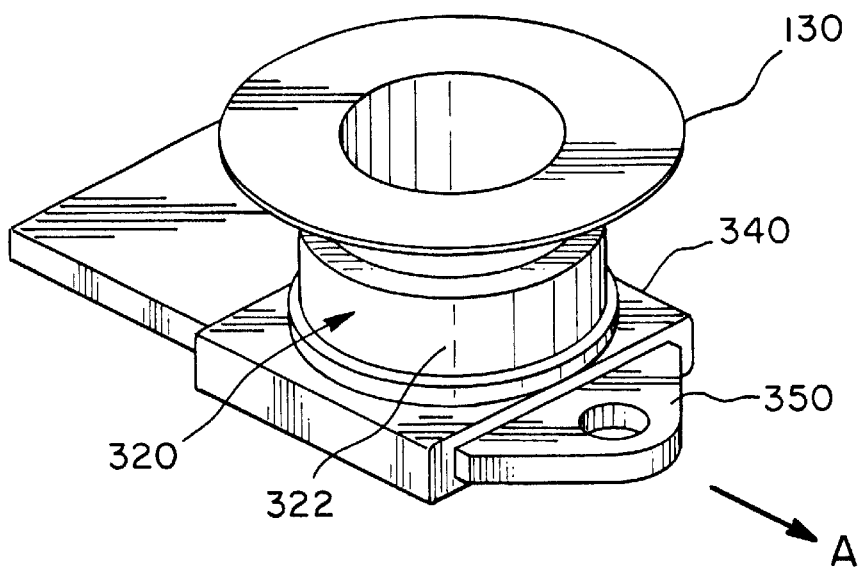
FIG. 5 is a perspective view of a dispensing valve of the present invention in an open position.

As shown in FIGS. 3 and 5, the dispensing valve 320 is opened by moving the gate 350 in the direction of arrow A such that the spout end 333 coaxial with the gate opening 355. In the open position, frozen product 132 can be dispensed from the spout 130. Further as shown in FIGS. 4 and 6, the dispensing valve 320 is closed by moving the gate 350 in the direction of arrow B such that the gate opening 355 is not coaxial with the spout end 333. In the closed position, frozen product 132 is stopped from being dispensed from the spout 130. Furthermore, the gate 350 can be placed in several positions between the extreme position shown in FIGS. 3–6. The positioning of the gate 350 in these other positions regulates the flow of the frozen product 132 from the spout 130. In addition, the movement of the gate 350 from the open position (shown in FIGS. 3 and 5) to the closed position (shown in FIGS. 4 and 6) allows the gate 350 to shear or break up any frozen product 132 or added products, such as, for example, chunks of fruit, nuts, chocolate or other ingredients that have been added to the frozen product 132. In this shearing action, the dispensing valve 320 is less prone to clogging when compared to conventional valves. In addition to prevent clogging, the gate opening 355 (FIGS. 3 and 4); 740–744 (FIG. 7); 820 (FIG. 8–9) and 1040 (FIG. 10) is of sufficient size to allow the free flow of the added products from the spout 130.

The movement of the gate 350 can be manual actuated by an operator of the dispensing system 100. In addition, the movement of the gate 350 can be mechanically actuated by an actuator 155 that is connected via line 153 to the controller 150 (shown in FIG. 1). In this embodiment, the controller 150 receives an input relating to the desired amount that has been selected by the customer and then instructs the actuator 155 to open the gate 350. The controller 150 will then determine the amount of force to apply to the piston 126 over an predetermined amount of time or a predetermined displacement of the piston 126 to dispense the desired amount of frozen product 132 and then instruct the actuator 155 to close the gate 350.

Figure 7:
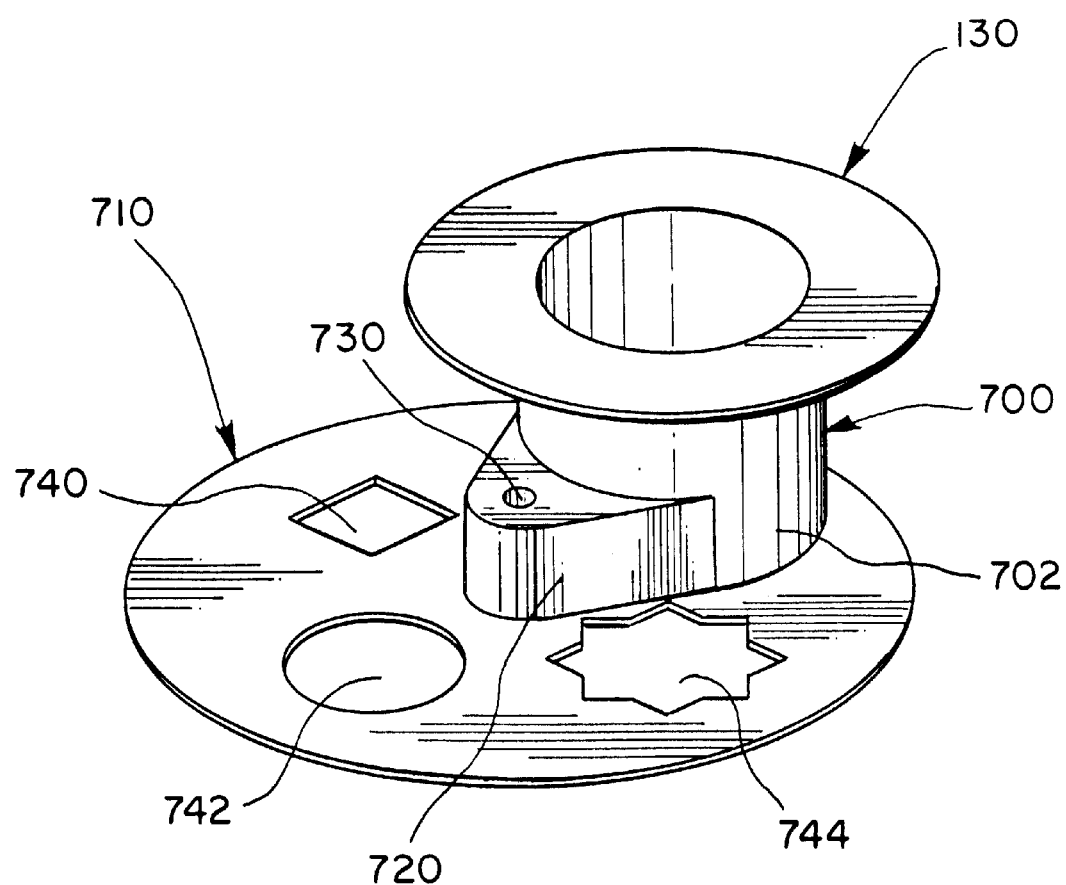
FIG. 7 is a perspective view of another embodiment of a dispensing valve of the present invention.

In FIGS. 3–6, the gate 350 is shown to having linear movement. However, as shown in FIGS. 7–13, the movement of the gate 350 can take several forms other than linear movement. In one embodiment, as shown in FIG. 7, the dispensing valve 700 connected to the spout 130 provides rotational movement. In this embodiment, the dispensing valve 700 includes a valve body 702 having a gate housing 720. A pivot 730 rotatably connects the gate housing 720 to a gate wheel 710. As such, the gate wheel 710 is rotatable about the pivot 730. Further, in this embodiment, the gate wheel 710 has a plurality of openings 740, 742 and 744, and preferably the gate wheel 710 has at least one area that does not contain a hole, as shown by the position of the dispensing valve 700 in FIG. 7. The closed area stops dispensing of the frozen product 132. To dispense the frozen product 132, the gate wheel 710 is positioned such that one of the openings 740, 742 and 744 is co-axial with the spout end 333 (shown in FIG. 3). In the embodiment shown in FIG. 7, the openings 740, 742 and 744 all have different geometric shapes. It should be appreciated that the geometric shapes of the openings 740, 742 and 744 can optionally be identical. In addition, the embodiment shown in FIG. 7 illustrates a plurality of opening 740, 742 and 744 located in the gate wheel 710. It should be appreciated that the gate wheel may have more or less openings as required by the particular dispensing system 100.

In another embodiment, as shown in FIGS. 8 and 9, the dispensing valve 810 also provides rotational movement. In this embodiment, the dispensing valve 810 includes a gate body 814 that is connected to the spout 130. A rotating gate 812 is rotatably attached to gate body 814. The rotating gate 812 includes an opening 820. To dispense frozen product 132, the rotating gate 812 is rotated until the opening 820 is coaxial with a spout opening 822, as shown in FIG. 8. To prevent dispensing of the frozen product 132, the rotating gate 812 is rotated until the gate opening 820 is no longer coaxial with the spout opening 822 and the spout opening 822 is completely blocked (as shown in FIG. 9).

Figure 10:
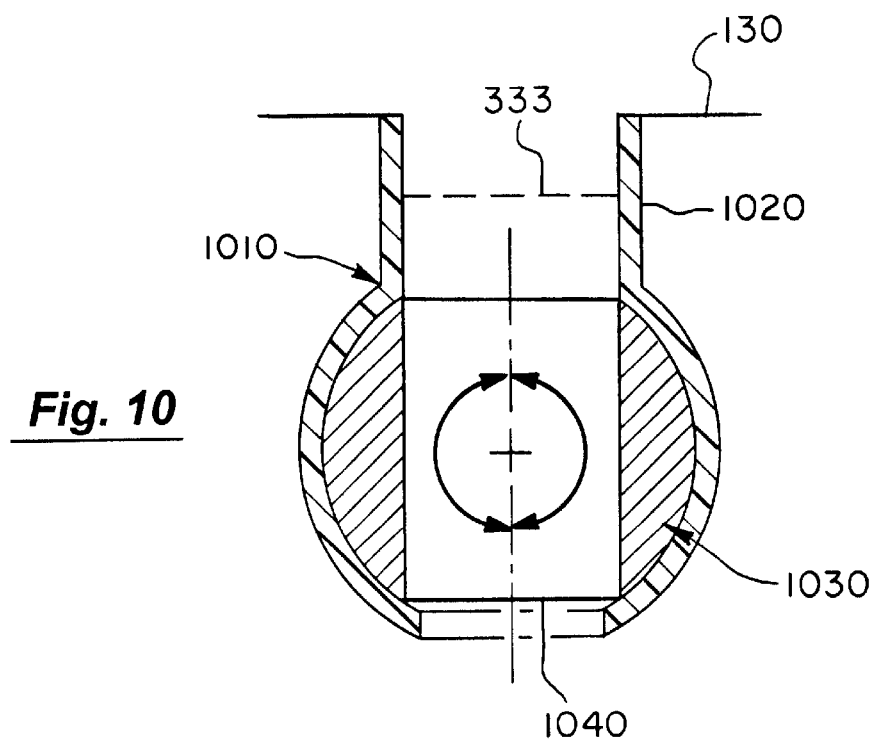
FIG. 10 is a perspective view of even another embodiment of a dispensing valve of the present invention in a open position.
Figure 11:
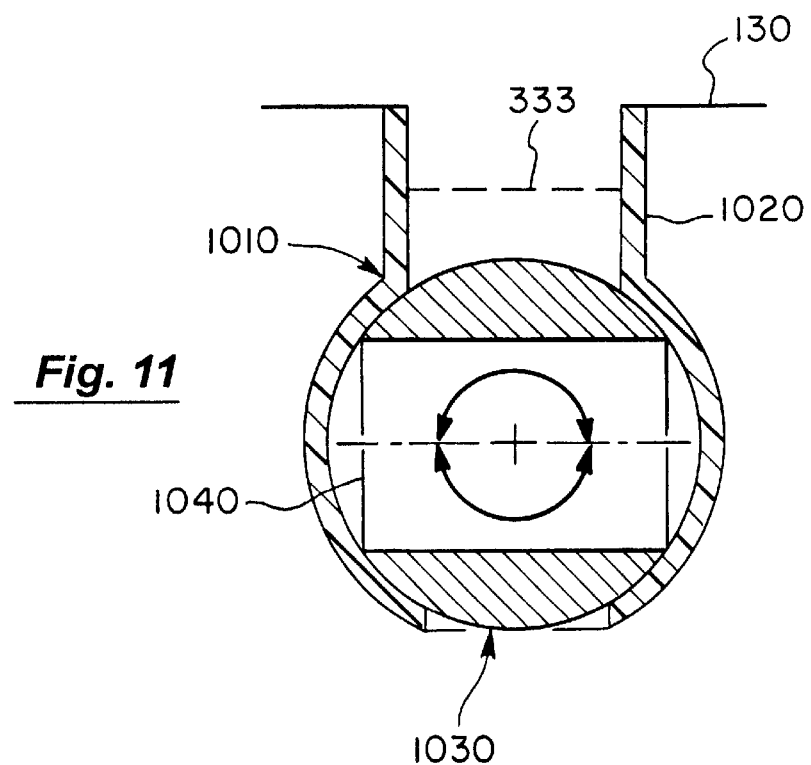
FIG. 11 is a perspective view of even another embodiment of a dispensing valve of the present invention in an closed position.

In a related embodiment, as shown in FIGS. 10 and 11, the dispensing valve 1010 is connected to the spout 130. This embodiment also includes a valve body 1020 and a rotating gate 1030 having an opening 1040. However, in this embodiment, the rotating gate 1030 is positioned within the valve body 1020. As such, the rotating gate 1030 rotatably moves within the valve body 1020. To dispense frozen product 132, the rotating gate 1030 is positioned such that the spout end 333 is coaxial with the gate opening 1040 (as shown in FIG. 10). To prevent frozen product 132 from being dispensed, the rotating gate 1030 is positioned such that opening 1040 is not coaxial with the spout end 333, and the spout end 333 is completely blocked (as shown in FIG. 11).

Figure 13:
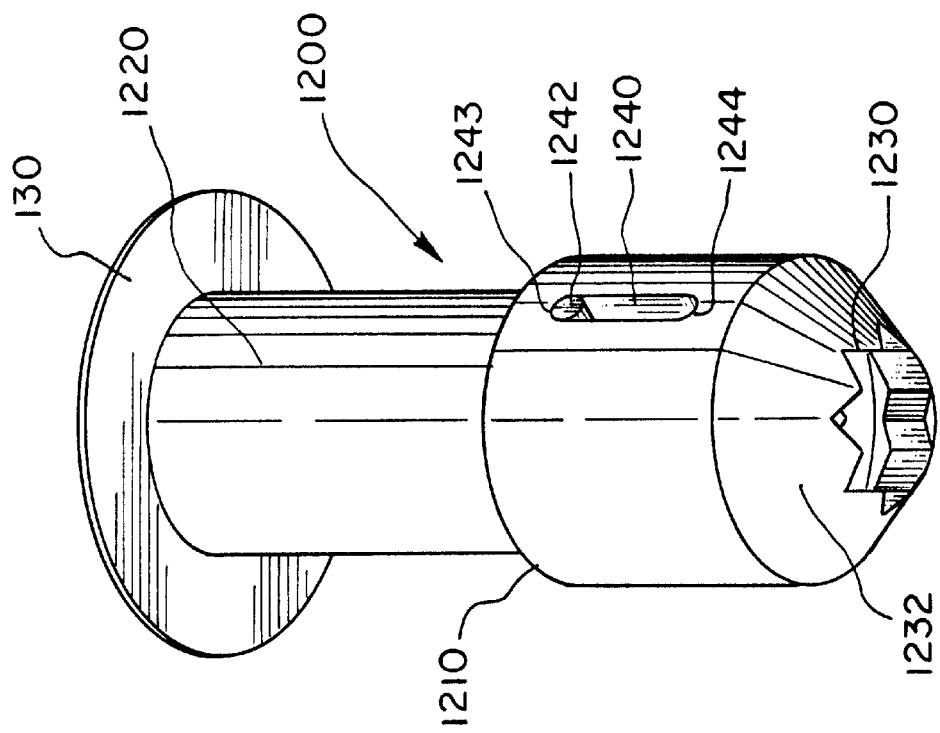
FIG. 13 is a perspective view of another embodiment of a dispensing valve of the present invention in a open position.
Figure 12:
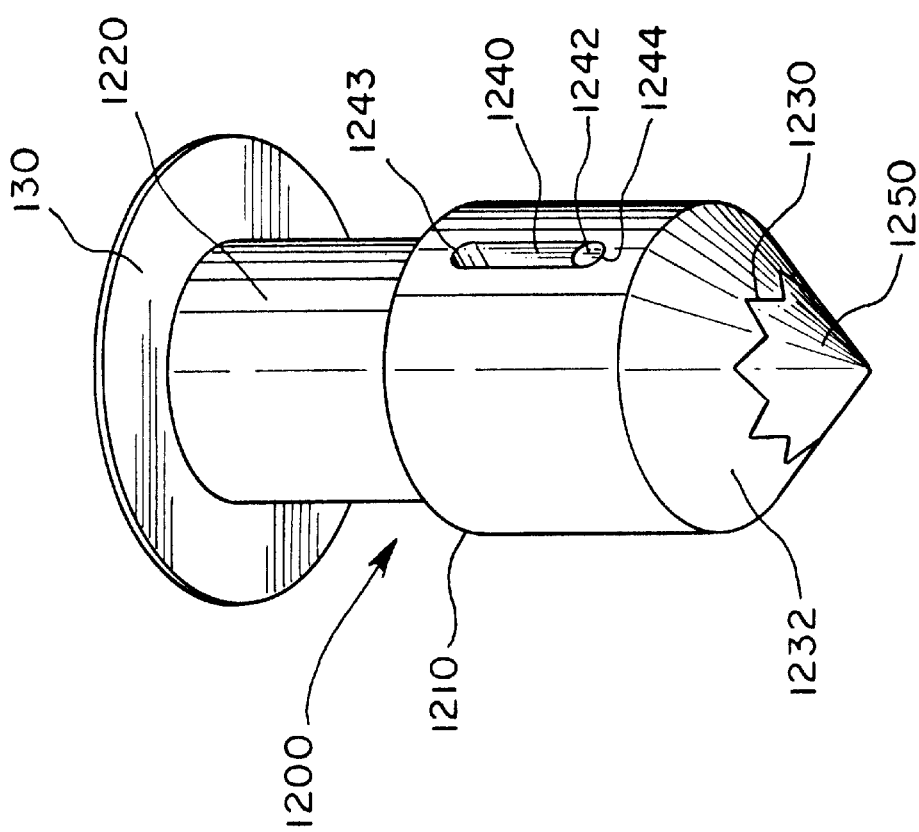
FIG. 12 is a cross-sectional view of another embodiment of a dispensing valve of the present invention in an closed position.

In yet another embodiment, as shown in FIGS. 12 and 13, the dispensing valve 1200 has a linearly-activated gate 1210 having a guide slot 1240. In this embodiment, a gate body 1220 is connected to the spout 130. The gate body includes a conical end 1250 and a guide pin 1242. The gate 1210 is movably connected to the gate body 1220 such that the guide pin 1242 is positioned in the guide slot 1240. The gate 1210 has an end portion 1232 in which an opening 1230 is formed. The end portion 1232 is also conically-shaped in correspondence with the conical shape of the conical end 1250 of the gate body 1220. As shown in FIGS. 12 and 13, the opening 1230 can have a star-shaped geometry. However, it should be appreciated that the geometrical shape of the opening can optionally be, for example, a circle. To prevent the dispensing valve 1200 from dispensing frozen product 132, the gate 1210 is moved such that the guide pin 1242 is positioned at a first end 1244 of guide slot 1240. This closed position also corresponds to the conical end 1250 of the gate body 1220 to contact the opening 1230 of the gate 1210. To allow frozen product 132 to be dispensed from the dispensing valve 1200, the gate 1210 is moved such that the guide pin 1240 is positioned at a second end 1243 of the guide slot 1242. This open position also corresponds to the opening 1230 not being in contact with conical end 1250 of the valve body 1220.

In summary, the dispensing system 100 of the present invention dispenses a desired portion of frozen product 132 at a uniform rate from a product container 120. The product container 120 has a spout 130 and a dispensing valve 320 connected to the spout 130. The dispensing valve 320 is used to seal the product container 120 after filling, and the dispensing valve 320 is also used to regulate the flow of frozen product 132. A label 170 is attached to the product container 120 to provide information relating to the frozen product 132. The data from label 170 is supplied to a controller 150 by a reader 160. Based on the information from the label 170, the controller 150 controls the force (F) applied by a drive 144 to the product container 120 in order to dispense the frozen product 132 at a uniform rate. The product container 120 is sufficiently rigid such that it is not deformed when force is applied to dispense the frozen product 132. The product container 120 is also sufficiently deformable so that it is collapsible when the product container 120 is empty of frozen product 132. In addition, a position sensor 125 is connected to the controller 150 to determine the volume of frozen product 132 in the product container 120 and when the product container 120 is empty of frozen product 132. As such, the present invention is not limited to the embodiments shown in the drawings. The drawings contained herein are for a preferred system embodiment and serve to illustrate the operation of the present invention.

3. Method of Operation

Figure 14:
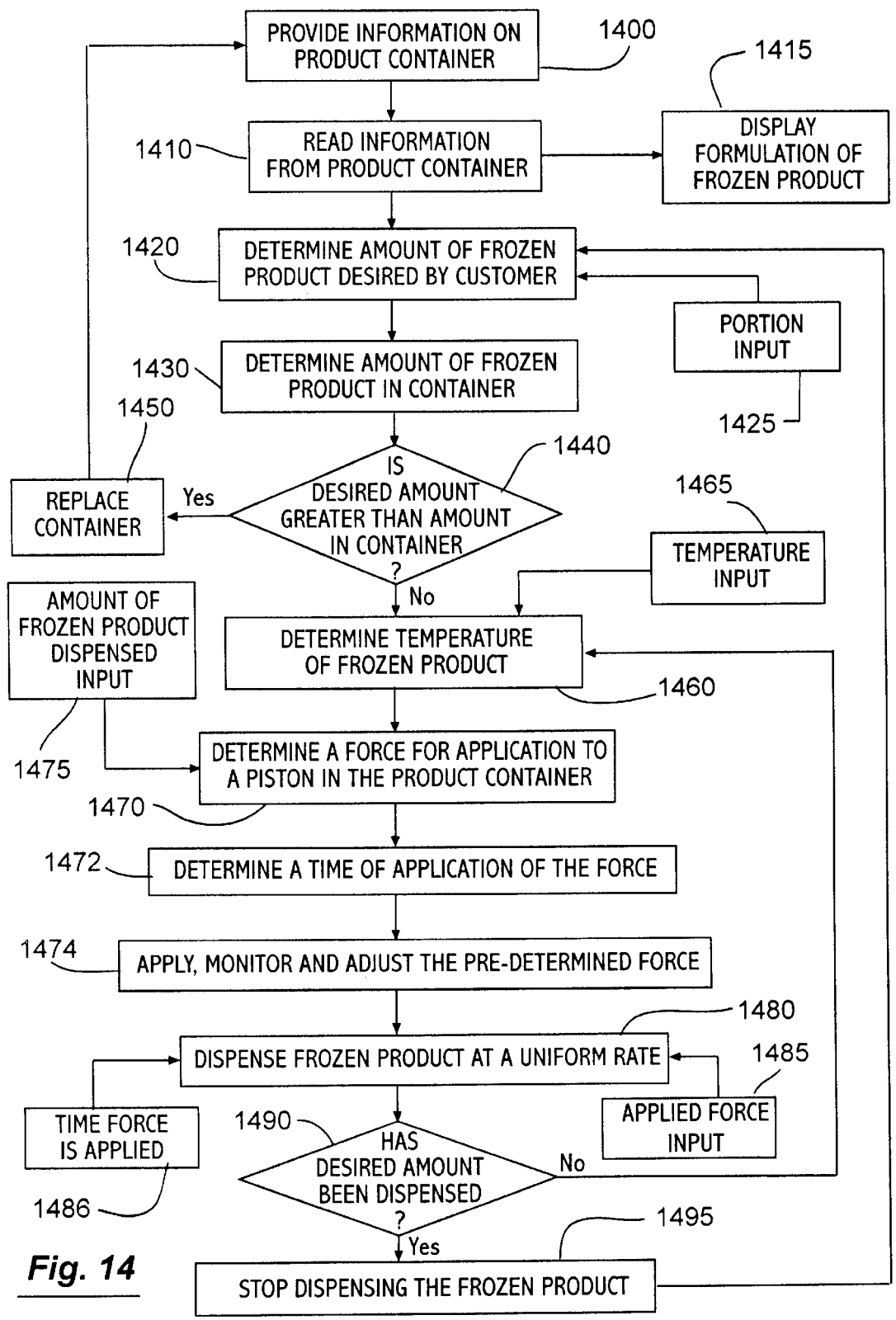
FIG. 14 is a flow chart showing one embodiment of a method for dispensing frozen product of the present invention.
Figure 15:
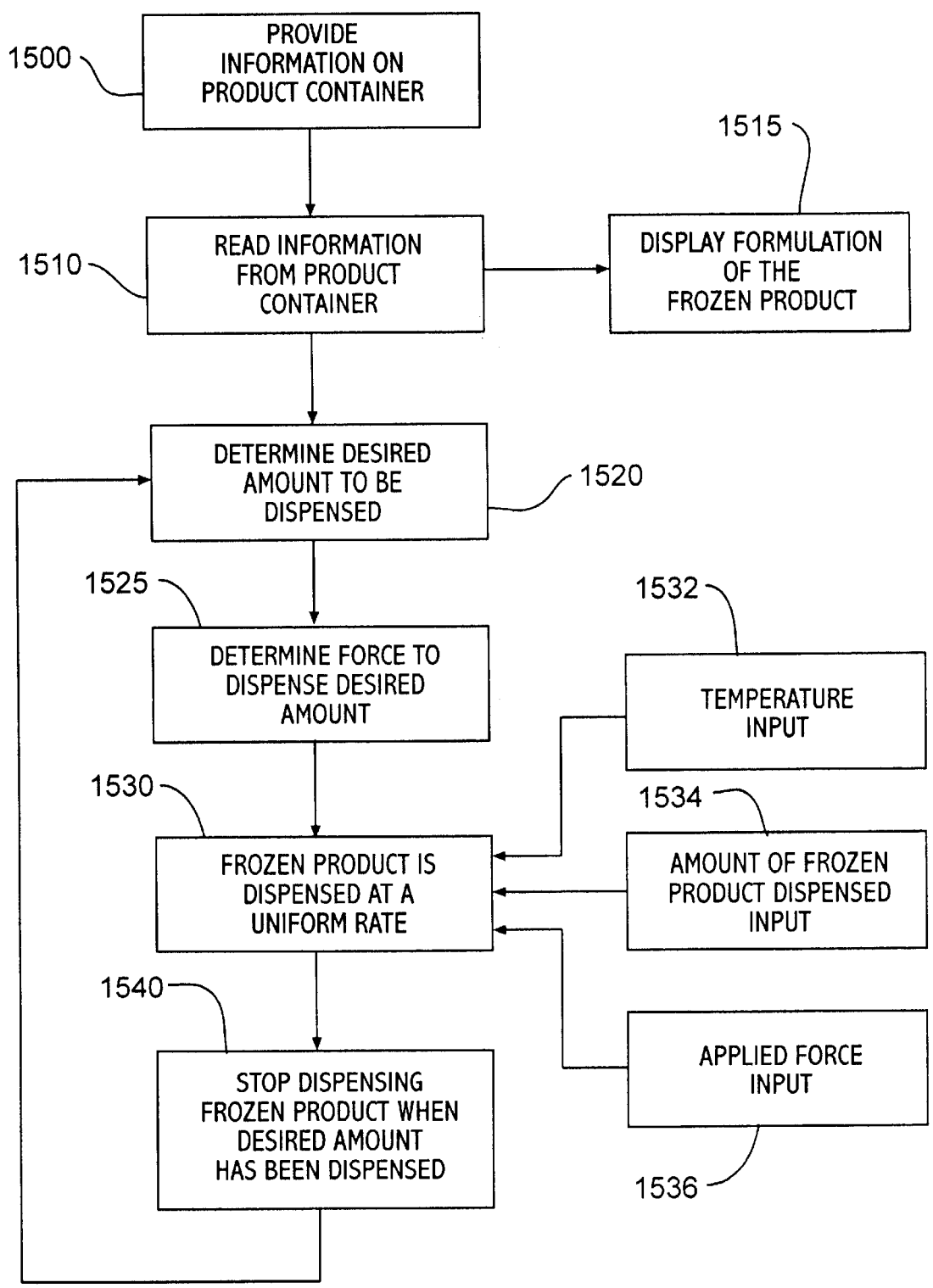
FIG. 15 is a flow chart showing another embodiment of a method for dispensing frozen product of the present invention.
Figure 16:
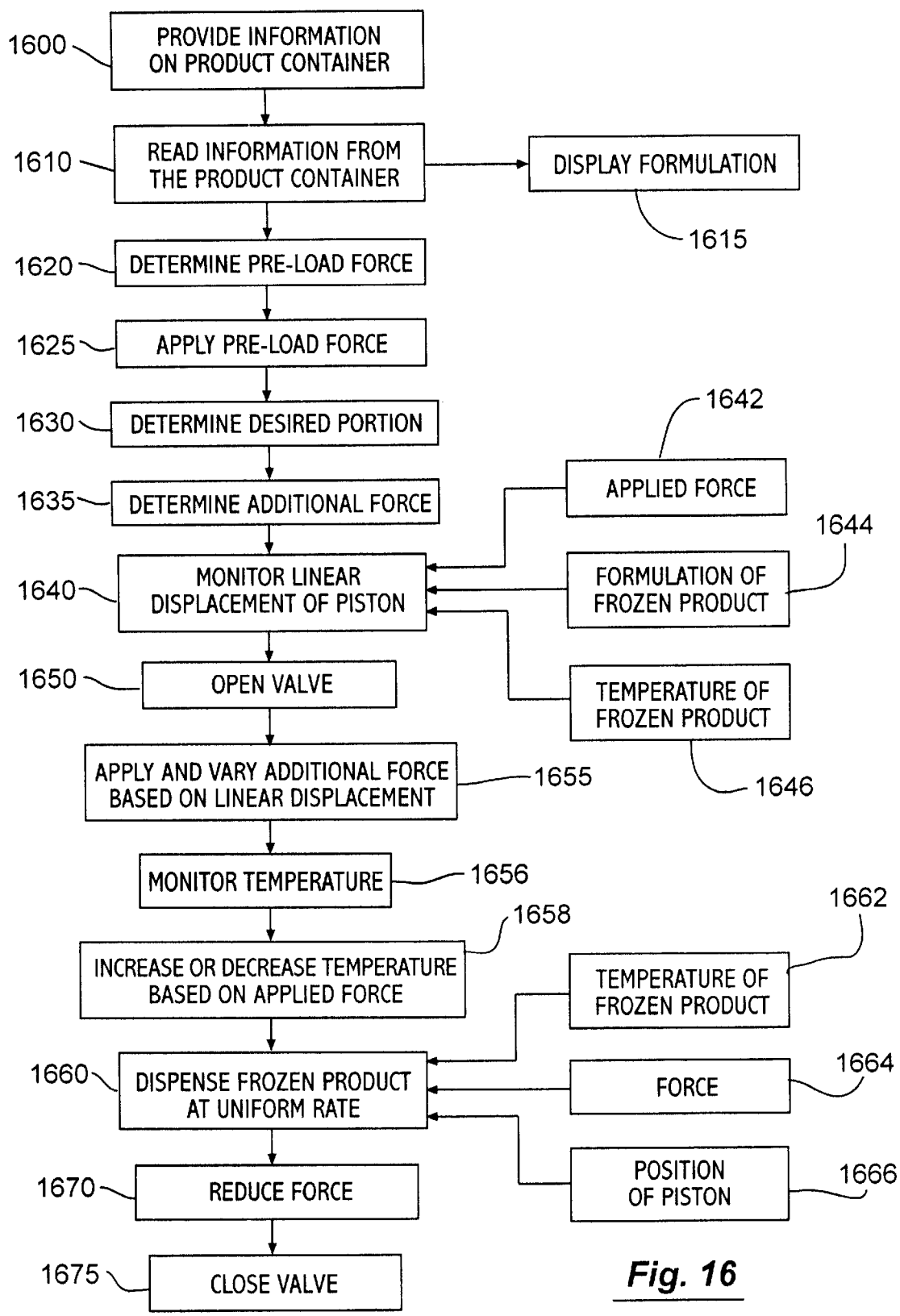
FIG. 16 is a flow chart showing another embodiment of a method for dispensing frozen product of the present invention.

As shown in FIGS. 14–16, one embodiment the present invention includes a preferred method for dispensing frozen product 132. The flow charts shown in FIGS. 14, 15 and 16 are function in nature and the controller 150 is suitably programmed to implement these functions. Furthermore, while the following presents these functions in a preferred embodiment as steps in a sequence, it is to be expressly understood that changes in the order of the sequence could occur without departing from the teachings of the present invention. Generally, in the method of the present invention, frozen product 132 is dispensed from a dispensing system 100 at a uniform rate to deliver a portion regardless of the formulation of the frozen product 132.

As shown in FIG. 14, information relating to the frozen product 132 is provided on the product container 120 (step 1400). In particular, the information can include the formulation, temperature requirements, force requirements linear displacement of the piston 126 or constant information, etc. This information in part allows the frozen product 132 to be dispensed at a uniform rate. The information is read from the product container 120 (step 1410). In one embodiment, the information can be read by reading a label 170 that is attached to the product container 120 using reader 160, and the label 170 information is supplied to the controller 150. The information is typically identified when the product container 120 is placed into the dispensing system 100 and should only changed when the product containers 120 are changed. Once the information has been read, the formulation of the frozen product 132 is displayed (step 1415). The formulation is typically displayed by a display device 172 that is connected to the controller 150 and the housing 102 of the dispensing system 100.

In addition, the desired amount of frozen product 132 is also determined (step 1420) through a portion input 1425. The desired amount of frozen product 132 is typically the amount of frozen product 132 that has been purchased by a customer. The desired amount may be selected by either the customer or an operator of the dispensing system 100. In one automated embodiment, the dispensing system 100 allows the customer or the operator to select the desired portion through an input device 101 connected to the controller 150 and, optionally, the housing 102. Also, in an automated dispensing system 100, the desired amount can be determined by the amount of money the customer input into the dispensing system 100.

The amount of frozen product 132 left in the product container 120 is then determined (step 1430). The amount of frozen product can be determined by the position of the piston 126 in the product container 120. The amount of frozen product 132 in the product container 120 is compared to the desired amount of product (step 1440). If the desired amount of frozen product 132 is greater than the amount in the product container 120, the product container 120 is replaced (step 1450). Also, it should be noted that the actual amount in the product container 120 can be dispensed and, after the product container 120 is replaced, the remainder of the desired amount can be dispensed. However, this dispensing option is dependent upon both the empty and newly added product containers 120 having the same formulation.

If the desired amount is less than the amount in the product container 120, the temperature of the frozen product 132 is determined (step 1460) through a temperature input 1465. The temperature can be determined by a temperature sensor 162 that is positioned near the product container 120.

From the parameters of temperature and formulation, the controller 150 determines a force (F) for application to a piston 126 in the product container 120 (step 1470). In another aspect of the present invention, the time that the force (F) should be applied to the piston is determined (step 1472). The pre-determined force (F) is applied, monitored and varied based on the parameters of temperature (1465), time (1486), force (1485) and formulation of the frozen product 132 (step 1474). The pre-determined force is varied by a feedback loop 151 connected to the controller 150, such as, for example, a proportional integral differential (PID) feedback loop. Due to the force (F) applied to the piston 126 in step 1474 by the feedback loop 151, the frozen product 132 is dispensed at a uniform rate (step 1480). The controller 150 continuous measures the force (F) applied to the piston 126 and the time that the force is applied to ensure that the correct amount of force (F) is being applied to dispense the desired portion of frozen product 132 at a uniform rate.

Next, the controller 150 determines whether the desired amount of frozen product 132 has been dispensed (step 1490) through an amount dispensed input 1475. If the desired amount of product 132 has been dispensed, the dispensing system 100 stops dispensing frozen product 132 (step 1495). However, if the desired amount of frozen product 132 has not been dispensed the temperature of the frozen product 132 is again determined (step 1460), the force (F) is applied to the piston 126 of the product container 120 (step 1470) and the frozen product 132 is dispensed at a uniform rate (step 1480). In this embodiment, the determination of the dispensing of the desired amount can be made by measuring the amount of time that the frozen product 132 is dispensed at the constant rate from the spout 130. It should be noted that the query of checking whether the desired amount of frozen product 132 has been dispensed can be made several times during dispensing the frozen product 132. In addition, the force (F) is monitored by the controller 150 using force sensor 164 and input through the applied force input 1485. As a result of this monitoring and the feedback loop 151, the force (F) applied to the piston 126 in the product container 120 is constantly adjusted (step 1474) to ensure that the frozen product 132 is dispensed at a constant rate. Once the desired amount has been dispensed, the dispensing system 100 stops dispensing frozen product 132 (step 1495).

In another embodiment of the method of the present invention, as shown in FIG. 15, the portion control features are not included. In this embodiment, an operator dispenses the frozen product 132 at a uniform rate and gauges the desired amount of frozen product 132 that has been dispensed. First, information is provided on the product container 120 (step 1500). The information is read from the product container 120 (step 1510). The information can include the formulation, the temperature, linear displacement of the piston 126 the force (F) required to dispense the frozen product 132 at a uniform rate or a constant value. The product information can be stored in memory of the controller 150, and the information can be accessed by a label 170 that is connected to the product container 120. The label 170 is read by a reader 160 connected to the controller 150 when the product container 120 is installed into the dispensing system 100. The information from the label 170 is supplied to the controller 150, and the controller 150 determines the force (F) to apply to the piston 126 such that the frozen product 132 is dispensed at a uniform rate. The formulation of the frozen product 132 is displayed (step 1515). The display typically comprises a sign 172 connected to the controller 150 and to the housing 102 of the dispensing system 100. In this embodiment, the desired amount of frozen product 132 that is to be dispensed is determined (step 1520). Once the desired amount has been determined, the force (F) required to dispense the desired amount is determined (step 1525). The frozen product 132 is dispensed from the dispensing system 100 at a uniform rate (step 1530). The uniform dispensing rate is determined by utilizing temperature input 1532, dispensed product input 1534 and an applied force input 1536. This uniform dispensing rate allows an operator to easily gauge the amount of frozen product 132 that has been dispensed regardless of the formulation of the frozen product 132. Once the desired amount has been dispensed, the dispensing of the frozen product 132 (step 1540). The uniform dispensing rate allows the operator to determine the amount of frozen product 132 that is dispensed and, therefore, less frozen product 132 is wasted.

In even another embodiment, as shown in FIG. 16, the frozen product 132 is automatically dispensed by monitoring at least the linear displacement of the piston 126. First, information relating to the frozen product 132 is provided on the product container 120 (step 1600). The information is read from the product container (step 1610). The information can include the formulation, the temperature, the linear displacement of the piston 126 and the pre-load force (F). The product information can be stored in memory in the controller 150, and the information can be accessed by correlation to a label 170 that is connected to the product container 120. The label 170 is read by a reader 160 connected to the controller 150 when the product container 120 is installed into the dispensing system 100. The information is supplied to the controller 150, and the formulation of the frozen product is displayed to the customer (step 1615). In step 1620, a pre-load force is determined (step 1620). The controller 150 then uses the information supplied from the step 1610 to apply a pre-load force (F) to the piston 126 (step 1625). This pre-load force (F) compresses the frozen product 132 to remove most of the air that is present in the frozen product 132.

Further, the desired amount of frozen product 132 is determined (step 1630). In one embodiment, the desired amount can be determined by a plurality of switches, touch pad or other suitable input devices 101 that are connected to the controller 150. In addition, it should be understood that determining the desired amount of frozen product 132 can be accomplished by any other suitable procedure or technique known in the art.

Once the desired amount is determined, an additional force is determined (step 1635). The additional force is a force that is above and beyond the pre-load force. The additional force is used to dispense the desired portion of frozen product 132. The controller 150 monitors the linear displacement of the piston 126 (step 1640). This monitoring of the linear displacement of the piston 126 is based upon the pre-load force (F) and additional force (1647), the formulation of the frozen product (1648) and the temperature of the frozen product (1649). The linear displacement of the piston 126 is a distance measurement that the piston 126 must travel in order for the desired amount of frozen product 132 to be dispensed. For example, in one embodiment, the displacement of the piston 126 is based on the (a.) formulation, (b.) pre-load force (F), (c.) additional force and the (d.) temperature. As such, in one example, the displacement could correspond to one (1) centimeter of piston 126 displacement equals five (5) milliliters of frozen product 132 dispensed. This example is for illustration only and should not be construed to limit the present invention.

Once the additional force has been determined and the linear displacement monitored, the dispensing valve 320 is opened (step 1650). The additional force is applied to piston 126 (step 1655). During application of the additional force, the temperature is monitored (step 1656). If the additional force exceeds the maximum or minimum force limits required by the dispensing system 100, the temperature is increased or decreased based on the value of the applied force (step 1658). For example, it should be noted that the force (F) can have a maximum and a minimum force limit based on the requirements of the dispensing system 100. In the event that the force applied to the piston 126 exceeds the maximum force limit, the temperature of the frozen product 132 can be increased by the controller 150 that is connected to a temperature control (not shown) in the housing 102. In the event that the force applied to the piston 126 is less than the minimum force, the temperature of the frozen product 132 can be decreased by the controller 150. It should be appreciated that due to the volume of the frozen product 132 in the product container 120 such changes in temperature occur over a particular amount of time and, therefore, do not occur instantaneously.

As such, the desired amount of frozen product 132 is dispensed at a uniform rate (step 1660). As shown in step 1660, during the dispensing of the frozen product 132, the inputs of the temperature (1662), force (1664) and the piston 126 position (1666) are monitored by the controller 150. in this monitoring, the controller 150 can use all or some of these inputs as a control input to a feedback loop 151, such as, for example, a proportional integral differential (PID) feedback loop. This feedback loop 151 can vary some or all of the parameters to ensure that the frozen product 132 is dispensed at a uniform rate.

Once the piston 126 has been displaced by the amount of linear displacement determined in step 1645, the force is reduced (step 1670), and the dispensing valve 320 is closed when the desired amount of frozen product 132 has been dispensed (step 1675). In reducing the force (step 1670), the additional force is reduced after the desired frozen product has been dispensed. In addition, the pre-load force can also be reduced to prevent loss or run-off of the frozen product 132.

The above-described embodiments of the method of the present invention ensures that the frozen product 132 is dispensed at a uniform rate regardless of the formulation of the frozen product 132 because the force (F) applied to the piston 126 is constantly adjusted based on various parameters associated with the frozen product 132. In addition, dispensing at a uniform rate allows a determination of the amount that is to be dispensed, and the dispensing system 100 can dispense the desired amount of frozen product 132 without wasting the frozen product 132 or shorting the customer out of the actual amount of frozen product 132 that has been purchased.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

What is claimed is:

1. An apparatus for dispensing frozen product, said apparatus comprising:
   (a) a product container containing said frozen product, said product container comprising:
   a first end;
   a second end opposite said first end;
   an interior portion bounded by said first and second ends having an interior wall;
   a dispensing spout connected to said first end;
   a piston movably positioned within said interior portion and sealing said second end;
   a raised annular edge located around a peripheral edge of said piston, said raised annular edge slightly bulging said interior wall such that said interior wall is cleaned of said frozen product when said piston moves toward said first end;
   a support ring engaging said second end of said product container, said support ring maintained in a fixed position in relation to movement of said piston;
   (b) a support structure connected to said apparatus and engaging said support ring of said product container, said support structure maintaining said support ring in said fixed position and holding said product container in a dispensing orientation wherein said first end is positioned below said second end;
   (c) a drive mechanism that abuts said piston positioned within said product container, said drive mechanism forcing said piston to move in a direction of said first end, said movement of said piston compressing said frozen product within said product container and extruding said frozen product from said dispensing spout,
   wherein said product container is sufficiently rigid such that said product container is not collapsed by movement of said piston and said product container is collapsible when said product container is empty of frozen product.

2. The apparatus, as claimed in claim 1, wherein said product container is composed of a flexible film laminate.

3. The apparatus, as claimed in claim 1, wherein said product container is cylindrical.

4. The apparatus, as claimed in claim 1, wherein said product container has a diameter ranging from about 6 to 8 inches and a length ranging from about 10 to 1:2 inches.

5. The apparatus, as claimed in claim 1, wherein said piston is circular.

6. The apparatus, as claimed in claim 1, wherein said piston is composed of plastic.

7. The apparatus, as claimed in claim 1, further comprising:
   a dispensing valve connected to said dispensing spout, said dispensing valve regulating a flow of said frozen product extruded from said dispensing spout.

8. An apparatus for dispensing frozen product, said apparatus comprising:
   (a) a product container containing said frozen product, said product container including:
   a piston movably positioned within an interior portion of said product container; and
   a spout connected to said product container;
   (b) a drive mechanism that abuts said piston, said drive mechanism applying a force to move said piston and compress said frozen product within said product container, said movement extruding said frozen product from said spout
   wherein said product container is sufficiently rigid such that said product container is not collapsed by movement of said piston and said product container is collapsible when said product container is empty of frozen product.

9. An apparatus for dispensing frozen product, said apparatus comprising:
   (a) a product container containing said frozen product, said product container comprising:
   a first end;
   a second end opposite said first end;
   an interior portion bounded by said first and second ends having an interior wall;
   a dispensing spout connected to said first end;
   a piston movably positioned within said interior portion and sealing said second end;
   a peripheral edge around said piston, contacting said interior wall,
   a support ring engaging said second end of said product container, said support ring maintained in a fixed position in relation to movement of said piston;
   (b) a support structure connected to said apparatus and engaging said support ring of said product container, said support structure maintaining said support ring in said fixed position and holding said product container in a dispensing orientation wherein said first end is positioned below said second end;
   (c) a drive mechanism that moves said position in a direction of said first end, said movement of said piston compressing said frozen product within said product container and extruding said frozen product from said dispensing spout,
   wherein said product container is sufficiently rigid such that said product container is not collapsed by movement of said piston and said product container is collapsible when said product container is empty of frozen product.

10. The apparatus, as claimed in claim 9, wherein said product container is composed of a flexible film laminate.

11. The apparatus, as claimed in claim 9, wherein said product container is cylindrical.

12. The apparatus, as claimed in claim 9, wherein said product container has a diameter ranging from about 6 to 8 inches and a length ranging from about 10 to 12 inches.

13. The apparatus, as claimed in claim 9, wherein said piston is circular.

14. The apparatus, as claimed in claim 9, wherein said piston is composed of plastic.

15. The apparatus, as claimed in claim 9, further comprising:
   a dispensing valve connected to said dispensing spout, said dispensing valve regulating a flow of said frozen product extruded from said dispensing spout.

16. An apparatus for dispensing frozen product, said apparatus comprising:
   (a) a product container containing said frozen product, said product container including:
      a piston movably positioned within an interior portion of said product container; and
      a spout connected to said product container;
   (b) a drive mechanism that moves said piston to compress said frozen product within said product container, said movement of said piston extruding said frozen product from said spout
   wherein said product container is sufficiently rigid such that said product container is not collapsed by movement of said piston and said product container is collapsible when said product container is empty of frozen product.

* * * * *